United States Patent
Osawa

(10) Patent No.: US 8,150,252 B2
(45) Date of Patent: Apr. 3, 2012

(54) IMAGING APPARATUS AND IMAGING APPARATUS CONTROL METHOD

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/909,641

(22) Filed: Oct. 21, 2010

(65) Prior Publication Data

US 2011/0097067 A1 Apr. 28, 2011

(30) Foreign Application Priority Data

Oct. 28, 2009 (JP) ................................ 2009-247886

(51) Int. Cl.
*G03B 15/03* (2006.01)

(52) U.S. Cl. .......................................... 396/61; 396/165

(58) Field of Classification Search ..................... 396/61, 396/165

See application file for complete search history.

(56) References Cited

U.S. PATENT DOCUMENTS

| | | | |
|---|---|---|---|
| 5,115,269 A | 5/1992 | Masanaga | |
| 5,666,571 A | 9/1997 | Matsumura | |
| 6,240,252 B1 | 5/2001 | Yamaguchi | |
| 6,654,062 B1 | 11/2003 | Yoshiyuki | |
| 6,859,618 B1 * | 2/2005 | Yip | 396/61 |
| 7,706,674 B2 * | 4/2010 | Sugimoto et al. | 396/61 |
| 2005/0128310 A1 | 6/2005 | Egawa | |
| 2005/0157206 A1 | 7/2005 | Kato | |
| 2007/0212054 A1 | 9/2007 | Kobayashi | |
| 2007/0229797 A1 | 10/2007 | Sugimoto | |
| 2008/0080851 A1 | 4/2008 | Endo | |
| 2008/0252773 A1 | 10/2008 | Oishi | |
| 2011/0097067 A1 * | 4/2011 | Osawa | 396/165 |

FOREIGN PATENT DOCUMENTS

| | | | |
|---|---|---|---|
| JP | 2005-181355 A | 7/2005 | |
| JP | 2005-204120 A | 7/2005 | |
| JP | 2005-275265 A | 10/2005 | |
| JP | 2007-025558 A | 2/2007 | |

\* cited by examiner

*Primary Examiner* — W. B. Perkey

(74) *Attorney, Agent, or Firm* — Canon USA Inc. IP Division

(57) ABSTRACT

When the depth information indicating a difference among a plurality of subjects in the size of subject distance is large, an imaging apparatus lowers a threshold value of the subject luminance to be referred to when determining whether to perform a shooting operation with light emission by an illumination device.

14 Claims, 13 Drawing Sheets

FIG.3

| PD1 | PD2 | PD3 | PD4 | PD5 | PD6 | PD7 |
|-----|-----|-----|-----|-----|-----|-----|
| PD8 | PD9 | PD10 | PD11 | PD12 | PD13 | PD14 |
| PD15 | PD16 | PD17 | PD18 | PD19 | PD20 | PD21 |
| PD22 | PD23 | PD24 | PD25 | PD26 | PD27 | PD28 |
| PD29 | PD30 | PD31 | PD32 | PD33 | PD34 | PD35 |

26

P02

P01

P13  P12  P11

P22

P21

P34

P33   P32   P31

IMAGING APPARATUS AND IMAGING APPARATUS CONTROL METHOD

BACKGROUND OF THE INVENTION

1. Field of the Invention

The present invention relates to an imaging apparatus and a method for controlling the same. In particular, the present invention relates to a light emission control in a shooting operation with flashlight.

2. Description of the Related Art

In a conventional imaging apparatus, it is generally known that a shooting operation is performed with an auxiliary light source, such as an illumination device (e.g., a flashlight device), in a case where the luminance of a subject is insufficient (low). Further, there is a conventional technique capable of automatically controlling light emission of the auxiliary light source (e.g., the illumination device) according to shooting conditions (including subject luminance).

For example, a conventional technique discussed in Japanese Patent Application Laid-Open No. 2005-204120 takes the luminance of a subject into consideration when performing a gain (sensitivity) control of an imaging apparatus and an automatic light emission control of a flashlight device. Further, a conventional technique discussed in Japanese Patent Application Laid-Open No. 2005-181355 includes obtaining information relating to the depth of a subject (i.e., a subject distance) based on a range-finding result of a range-finding device having a plurality of range-finding points when a shooting operation with flashlight is performed and controlling the shutter speed in a flashlight shooting operation.

The technique discussed in Japanese Patent Application Laid-Open No. 2005-204120 includes setting a lower imaging gain when an image capturing operation is performed if the luminance of a subject is sufficiently bright. However, if the subject luminance becomes lower, the shutter speed may become slower than a predetermined value unless the imaging gain is increased. Therefore, the conventional technique includes increasing the imaging gain sufficiently to maintain the shutter speed at an appropriate level.

Further, the conventional technique includes performing a shooting operation with flashlight if the subject luminance becomes lower and a required imaging gain exceeds an upper-limit value. However, the exposure value realized by the shooting operation with flashlight is only appropriate for subjects that are positioned at the same distance.

Therefore, according to the technique discussed in Japanese Patent Application Laid-Open No. 2005-204120, in a case where a flashlight shooting operation is performed for two or more subjects that are different in subject distance and are simultaneously present in an image-capturing screen, if the light emission amount is controlled to provisionally realize an appropriate exposure for a subject positioned on the near side, the light quantity for a subject positioned on the far side will be insufficient.

Further, in a case where there is a large difference between the background light and the flashlight in color temperature, the near side subject is prioritized in the white balance control and therefore an image of the far side subject may become darker with unnatural color reproduction. In short, obtaining an adequate image for each of all subjects that are different in subject distance is difficult.

Hence, the technique discussed in Japanese Patent Application Laid-Open No. 2005-181355 proposes to set a slower shutter speed in a shooting operation with flashlight if it is determined that the subject depth is larger compared to a case where it is determined that the subject depth is smaller, based on the range-finding result of the range-finding device having a plurality of range-finding points. The above-described setting is effective to reduce the darkness of a subject positioned on the far side because the exposure amount by the background light can be increased.

However, generally for the purpose of reducing camera shake, a lower limit is set for the shutter speed in the flashlight shooting operation. If the shutter speed is set to a lower value, it will be difficult to obtain an image free from blur.

SUMMARY OF THE INVENTION

The present invention is directed to a technique capable of capturing an adequate image even in a shooting operation for a plurality of subjects that are different in subject distance.

According to an aspect of the present invention, an imaging apparatus capable of performing a shooting operation with an illumination device includes a light metering unit configured to measure a subject luminance, an acquisition unit configured to acquire information relating to subject distances of a plurality of areas, and a light emission control unit configured to cause the illumination device to emit light in a shooting operation if the subject luminance measured by the light metering unit is less than a threshold value, wherein the light emission control unit is configured to change the threshold value according to a difference among the plurality of areas in subject distance based on the information acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example configuration of a light metering sensor according to an exemplary embodiment of the present invention.

DESCRIPTION OF THE EMBODIMENTS

Various exemplary embodiments, features, and aspects of the invention will be described in detail below with reference to the drawings.

Figure 1:
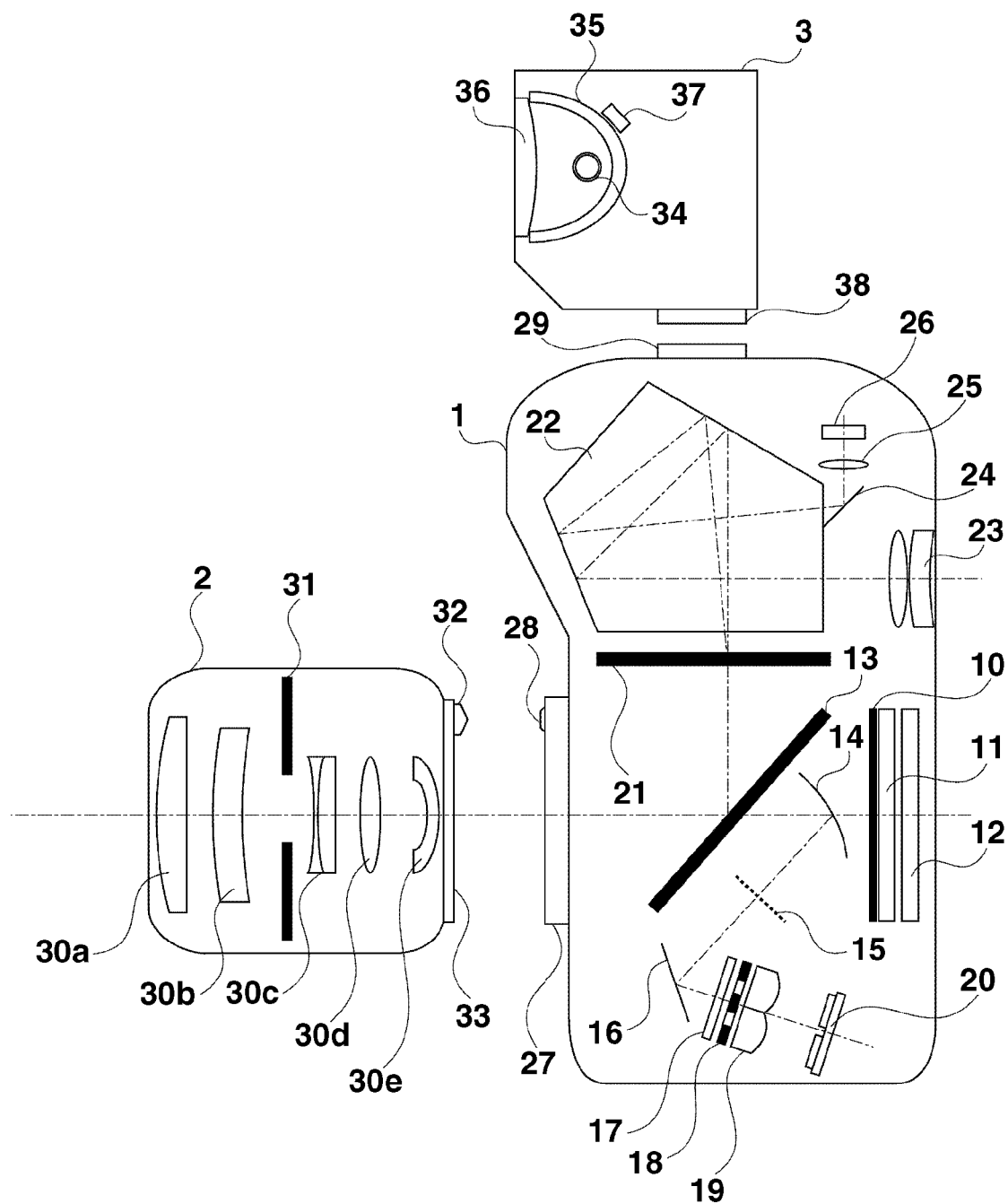
FIG. 1 is a cross-sectional view illustrating a camera, an interchangeable lens, and a flashlight device according to an exemplary embodiment of the present invention.

FIG. 1 is a cross-sectional view illustrating a camera, an interchangeable lens, and a flashlight device according to an exemplary embodiment of the present invention. The camera illustrated in FIG. 1 is functionally operable as an imaging apparatus. The flashlight device illustrated in FIG. 1 is functionally operable as an illumination device. In the present exemplary embodiment, the camera is a single-lens reflex camera using an interchangeable lens. However, the camera may be constituted as a lens-integrated camera. Further, the flashlight device serving as the illumination device is an external flashlight device detachable from a camera main body or may be a built-in flashlight device incorporated in the camera main body.

FIG. 1 illustrates a camera main body 1, an interchangeable lens 2, and a flashlight device 3. The camera main body 1 includes a mechanical shutter 10, a low-pass filter 11, and an image sensor 12. The image sensor 12 is, for example, an area accumulation type photoelectric conversion element, such as a Complementary Metal Oxide Semiconductor (CMOS) sensor or a Charge-Coupled Device (CCD) sensor.

The image sensor 12 includes a pixel portion and a reading portion. The pixel portion is constituted by a photoelectric element capable of converting incident light into electric charge according to a quality of the light and accumulating the converted electric charge in its capacitance portion. The reading portion can output the accumulated electric charge in a predetermined order. The reading portion includes an amplifying portion that can amplify the accumulated electric charge with a variable gain in a reading operation. The reading gain settable by the amplifying portion is related to photographic sensitivity as described below.

The camera main body 1 includes a semi-transmissive main mirror 13 and a first reflection mirror 14, which are respectively moved upward in a shooting operation. An image-forming surface 15 is conjugate against an image sensor surface by the first reflection mirror 14. The camera main body 1 further includes a second reflection mirror 16, an infrared cut filter 17, a diaphragm 18 having two apertures, a secondary image-forming lens 19, and a focus detection sensor (AF sensor) 20.

Figure 2:
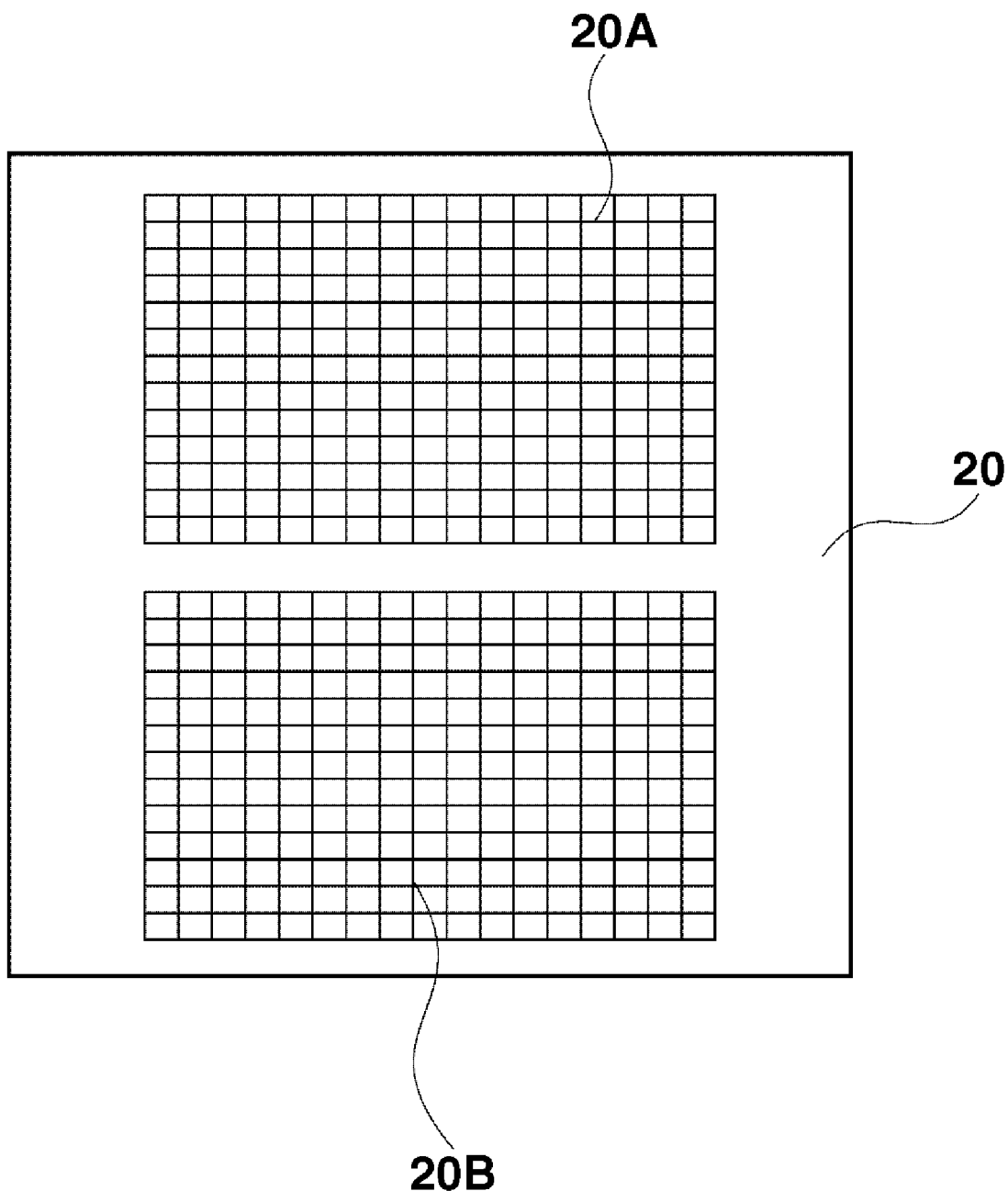
FIG. 2 illustrates an example configuration of a focus detection sensor according to an exemplary embodiment of the present invention.

The focus detection sensor 20 is, for example, an area accumulation type photoelectric conversion element, such as a CMOS sensor or a CCD sensor. The focus detection sensor 20 includes two rectangular areas 20A and 20B, as illustrated in FIG. 2, which correspond to two apertures of the diaphragm 18. Each of the rectangular areas 20A and 20B is composed of numerous light-receiving sensing portions. The mechanical configuration extending from the first reflection mirror 14 to the focus detection sensor 20 enables focus detection according to an image shift method at an arbitrary position in an image-capturing screen.

The camera main body 1 further includes a diffusible focusing plate 21, a pentaprism 22, an eyepiece lens 23, a third reflection mirror 24, a condensing lens 25, and a light metering sensor (AE sensor) 26 that can obtain information relating to the luminance of a subject.

The light metering sensor 26 is, for example, constituted by a photoelectric conversion element (e.g., a silicon photodiode). As illustrated in FIG. 3, the light metering sensor 26 is composed of a plurality of light-receiving sensing portions that are arranged in a matrix pattern. In the present exemplary embodiment, the image-capturing screen is composed of 35 (7 columns×5 lines) divided areas, which are hereinafter referred to as light-receiving portions (light metering areas) PD1 to PD35. The light metering sensor 26 receives part of incident light (other than the optical axis) reflected by the main mirror 13 and diffused by the focusing plate 21.

Figure 4:
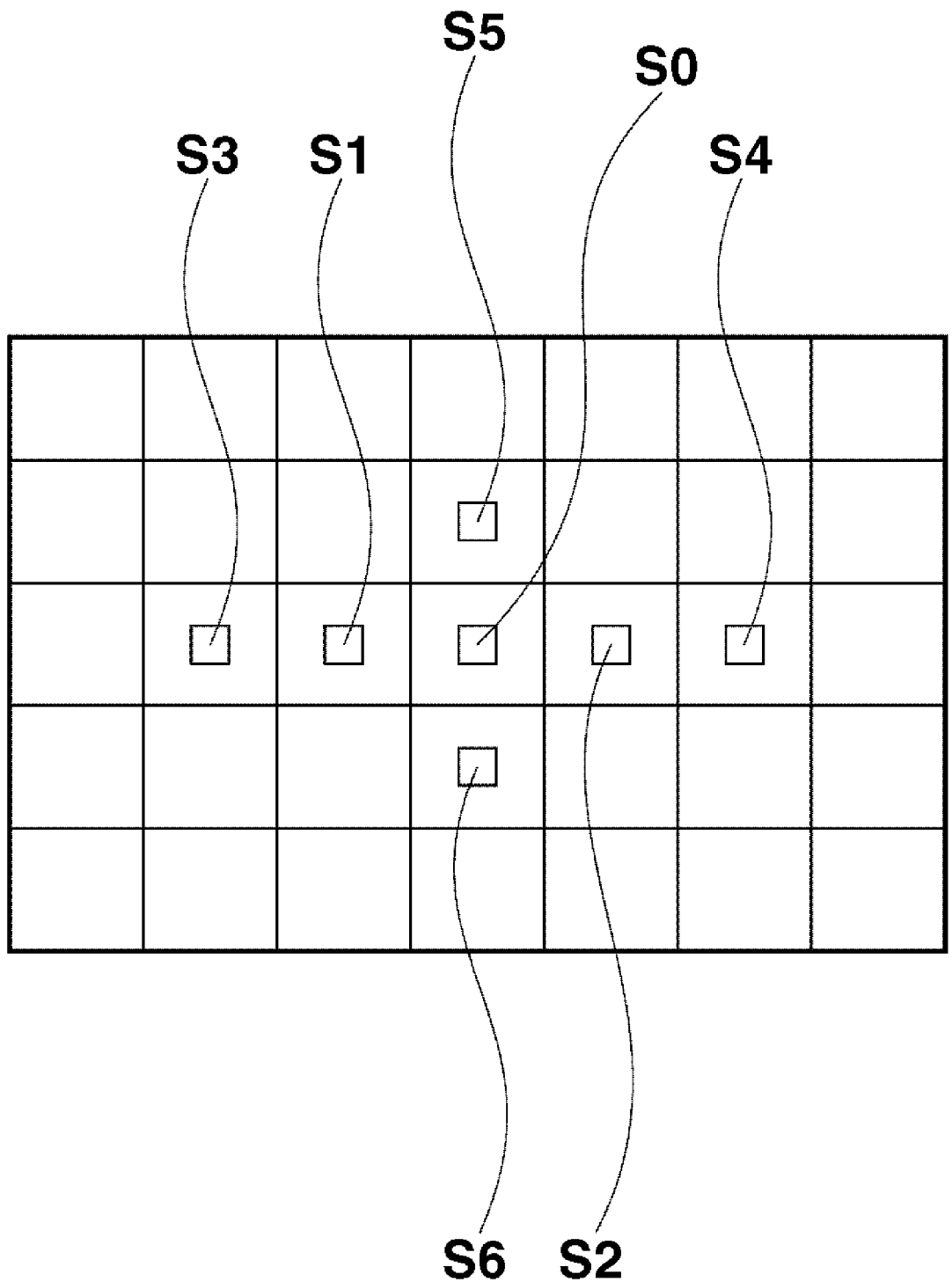
FIG. 4 illustrates a positional relationship between focus detection areas and light metering areas in an image-capturing screen.

FIG. 4 illustrates a positional relationship between a plurality of focus detection areas provided in the image-capturing screen and a total of 35 light metering areas of the light metering sensor 26. In each focus detection area, a focus detecting operation is feasible with the focus detection sensor 20.

In the present exemplary embodiment, seven focus detection areas S0 to S6 are provided in the image-capturing screen. The focus detection area S0 is a position where the focus detection corresponding to the light metering area PD18 of the light metering sensor 26 is performed. The remaining focus detection areas S1 to S6 are positions where the focus detection corresponding to mutually different light metering areas is performed as illustrated in FIG. 4.

The total number of the focus detection areas and the total number of the light metering areas are not limited to the above-described examples. For example, the total number of the focus detection areas may be equal to the total number of the light metering areas.

The camera main body 1 illustrated in FIG. 1 includes a mount portion 27 to which a photographic lens is attached, a joint portion 28 via which the camera main body 1 can perform information communication with the photographic lens, and a joint portion 29 to which the flashlight device 3 is attached.

The interchangeable lens 2 includes optical lenses 30a to 30e that cooperatively constitute the photographic lens, a diaphragm 31, a joint portion 32 via which the interchangeable lens 2 can perform information communication with the camera main body 1, and a mount portion 33 to which the camera main body 1 is attached.

The flashlight device 3 includes a xenon tube (light-emitting device) 34, a reflector 35, a condensing Fresnel lens 36, a monitor sensor 37 capable of monitoring the quantity of light emitted by the xenon tube 34, and a joint portion 38 via which the flashlight device 3 is attached to the camera main body 1.

Figure 5:
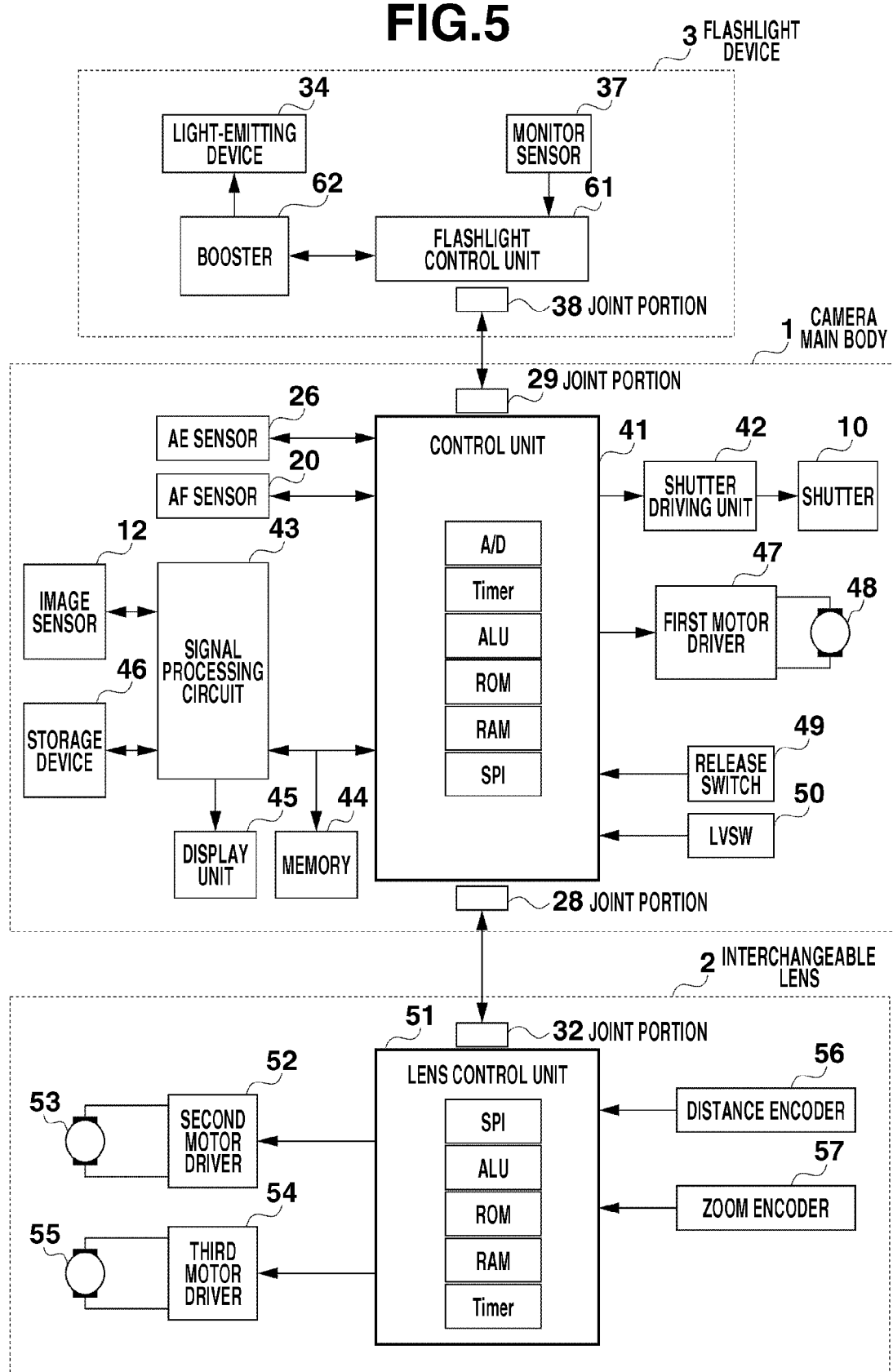
FIG. 5 is a block diagram illustrating an example configuration of electric circuits constituting the camera, the interchangeable lens, and the flashlight device according to an exemplary embodiment of the present invention.

FIG. 5 is a block diagram illustrating an example configuration of electric circuits constituting the camera main body 1, the interchangeable lens 2, and the flashlight device 3 according to the present exemplary embodiment. The camera main body 1 includes a control unit 41. The control unit 41 is, for example, a one-chip microcomputer that incorporates an arithmetic and logic unit (ALU), a read only memory (ROM), a random access memory (RAM), an analog/digital (A/D) converter, a timer, and a serial communication port (SPI). The control unit 41 can control a camera mechanism. An example procedure of control processing performed by the control unit 41 is described below.

In FIG. 5, the focus detection sensor 20 and the light metering sensor 26 are identical to those illustrated in FIG. 1.

The control unit 41 includes A/D converter input terminals and output signals of the focus detection sensor 20 and the light metering sensor 26 are input to the A/D converter input terminals.

A shutter driving unit 42 is connected to an output terminal of the control unit 41 and can drive the mechanical shutter 10 illustrated in FIG. 1. A signal processing circuit 43 can control the image sensor 12 according to an instruction of the control unit 41 and can set a reading gain of the image sensor 12. Further, the signal processing circuit 43 can convert an analog image capturing signal received from the image sensor 12 into a digital signal, and can perform signal processing on the input signal to obtain image data.

Further, the signal processing circuit 43 is functionally operable to extract characteristic features (e.g., eye, mouth) from the image data to detect a human face area. Namely, the signal processing circuit 43 has a face detection function. Further, the signal processing circuit 43 can perform image processing (e.g., compression) if required to record the obtained image data. The signal processing circuit 43 can generate image data to be displayed.

A memory 44, such as a dynamic random access memory (DRAM), is usable as a work memory when the signal processing circuit 43 performs various signal processing. The memory 44 can be used as a video random access memory (VRAM) when an image is displayed on a display unit 45.

A display unit 45 is constituted by a thin film transistor (TFT) liquid crystal panel or an organic electroluminescence (EL) panel to display various shooting information and captured images. The image data to be displayed is supplied from the signal processing circuit 43 to the display unit 45 according to an instruction of the control unit 41. The display is controlled by the control unit 41.

A storage device 46 is a flash memory or an optical disk capable of storing captured image data. A first motor driver 47 is connected to an output terminal of the control unit 41 and can drive a first motor 48 to adjust an up and down movement of the main mirror 13 and the first reflection mirror 14 according to a control signal. Further, the first motor driver 47 can charge the mechanical shutter 10.

The camera main body 1 further includes a release switch 49 and a live view start switch 50. The live view start switch 50 is operable to start a live view function for successively displaying through images periodically captured by the image sensor 12 on the display unit 45. The joint portion 28 illustrated in FIG. 1, via which the camera main body 1 is connected to the interchangeable lens 2, can be used to input and output signals from and to a serial communication port of the control unit 41. The flashlight device joint portion 29 illustrated in FIG. 1, via which the camera main body 1 can communicate with the flashlight device 3, can be used to input and output signals from and to the serial communication port of the control unit 41.

The interchangeable lens 2 includes a lens control unit 51, a second motor driver 52, a second motor 53, a third motor driver 54, a third motor 55, a distance encoder 56, and a zoom encoder 57. The lens control unit 51 is, for example, a one-chip microcomputer that incorporates an ALU, a ROM, a RAM, a timer, and a SPI. The second motor driver 52 is connected to an output terminal of the lens control unit 51 and can drive the second motor 53 to perform a focus adjustment.

The third motor driver 54 is connected to an output terminal of the lens control unit 51, and can drive the third motor 55 to move the diaphragm 31 illustrated in FIG. 1 according to a control signal supplied from the lens control unit 51.

The distance encoder 56 is connected to an input terminal of the lens control unit 51, and can obtain information relating to an extended amount of a focus adjustment lens, i.e., in-focused shooting distance. The zoom encoder 57 is connected to an input terminal of the lens control unit 51, and can obtain focal distance information in a shooting operation if the interchangeable lens 2 is a zoom lens. The joint portion 32 illustrated in FIG. 1 can be used to input and output signals from and to the serial communication port of the lens control unit 51.

When the joint portion 28 of the camera main body 1 is coupled with the joint portion 32 of the interchangeable lens 2, the lens control unit 51 can start data communication with the control unit 41 of the camera main body 1. For example, lens-unique optical information that is required when the control unit 41 of the camera main body 1 performs focus detection and exposure calculation, information relating to subject distance, or focal distance information, can be transmitted from the lens control unit 51 to the control unit 41 of the camera main body 1 in the data communication.

Further, focus adjustment information and diaphragm information obtained as a result of the focus detection and the exposure calculation performed by the control unit 41 of the camera main body 1 can be transmitted from the control unit 41 of the camera main body 1 to the lens control unit 51 in the data communication. Then, the lens control unit 51 controls the second motor driver 52 based on the focus adjustment information and controls the third motor driver 54 based on the diaphragm information.

The flashlight device 3 includes a flashlight control unit 61, which is constituted by a one-chip microcomputer that incorporates an ALU, a ROM, a RAM, an A/D converter, a timer, and a serial communication port (SPI).

The flashlight device 3 further includes a booster 62, which is functionally operable to generate a high voltage of approximately 300 V required for light emission of the xenon tube 34 and charge the xenon tube 34 at the generated voltage. The xenon tube 34 and the monitor sensor 37 are similar to those illustrated in FIG. 1. When the flashlight device 3 is attached to the camera main body 1, their joint portions 38 and 29 are connected to enable the flashlight control unit 61 to perform data communication with the control unit 41 of the camera main body 1.

The flashlight control unit 61 controls the booster 62 according to a communication content received from the control unit 41 of the camera main body 1 to start and stop light emission by the xenon tube 34. The control unit 41 of the camera main body 1 can instruct a light emission amount, and perform light emission stop control while monitoring a detection amount of the monitor sensor 37 so that the light emission amount can be adjusted according to an instruction amount.

Subsequently, an example operational sequence of processing according to an exemplary embodiment of the present invention, which can be performed by the control unit 41 of the camera main body, is described below according to a flowchart illustrated in FIG. 6.

If a power source switch (not illustrated) is turned on to cause the control unit 41 to start an operation, then in step S101, the control unit 41 communicates with the flashlight control unit 61. The control unit 41 instructs the flashlight control unit 61 to activate the booster 62 to generate a sufficiently high voltage for flashlight emission. Next, in step S102, the control unit 41 communicates with the lens control unit 51, and obtains various lens information that is required for the focus detection and light metering processing.

In step S103, the control unit 41 checks whether the live view start switch 50 is turned on. If it is determined that the live view start switch 50 is not turned on (NO in step S103), the processing proceeds to step S104. If it is determined that the live view start switch 50 is turned on (YES in step S103), the processing proceeds to step S109.

In step S104, the control unit 41 outputs a control signal to the focus detection sensor 20 to perform signal accumulation. If the accumulation is completed, the control unit 41 reads an analog signal accumulated in the focus detection sensor 20, and converts the read analog signal into digital data. Further, the control unit 41 performs various data correction processing (e.g., shading) on each read digital data.

In step S105, the control unit 41 calculates a focusing state of each focus detection area on an image-capturing screen based on the lens information acquired in step S102 (i.e., information required for the focus detection) and digital data obtained by the focus detection sensor 20. Further, the control unit 41 determines a target area to be focused in the image-capturing screen, which is selectable from the focus detection areas S0 to S6 (see FIG. 4). A photographer (not illustrated) can manipulate an operation member to select the target area. Alternatively, the control unit 41 can identify an area where a main subject is present as the target area based on the calculated focusing state.

Then, the control unit 41 calculates a lens moving amount required to bring the photographic lens into an in-focused state according to the focusing state of the determined area, and outputs the calculated lens moving amount to the lens control unit 51. The lens control unit 51 outputs a control signal corresponding to the calculated lens moving amount to the second motor driver 52. The second motor driver 52 drives the second motor 53 to drive the focus adjustment lens. Thus, the photographic lens can be brought into an in-focus state for a subject existing in a determined area. In this case, information to be obtained by the distance encoder 56 changes in accordance with the movement of the focus adjustment lens. Therefore, the control unit 41 can update various lens information.

After the photographic lens is brought into the in-focus state for the subject, the control unit 41 performs the signal accumulation again using the focus detection sensor 20 to calculate a focusing state of each focus detection area in the image-capturing screen. Then, the control unit 41 stores the calculation result so that the calculated focusing state can be later used as depth information of the subject.

In the present exemplary embodiment, DF(n) represents a defocus amount of respective focus detection areas S0 to S6, in which "n" is an integer (0 to 6) identifying each of the detection areas S0 to S6. Further, the defocus amount calculated in this case is information relating to the subject distance in a plurality of areas. In other words, by executing the processing in step S102, the control unit 41 can acquire information relating to a plurality of subject distances.

In step S106, the control unit 41 reads signals from respective light metering areas PD1 to PD35 (i.e., 35 divided light metering areas) of the light metering sensor 26, and inputs A/D converted luminance information of each light metering area. Further, the control unit 41 corrects the luminance information of each light metering area based on the lens information acquired in step S102 and required in the light metering processing. Then, the control unit 41 obtains subject luminance information of each light metering area.

Figure 7:
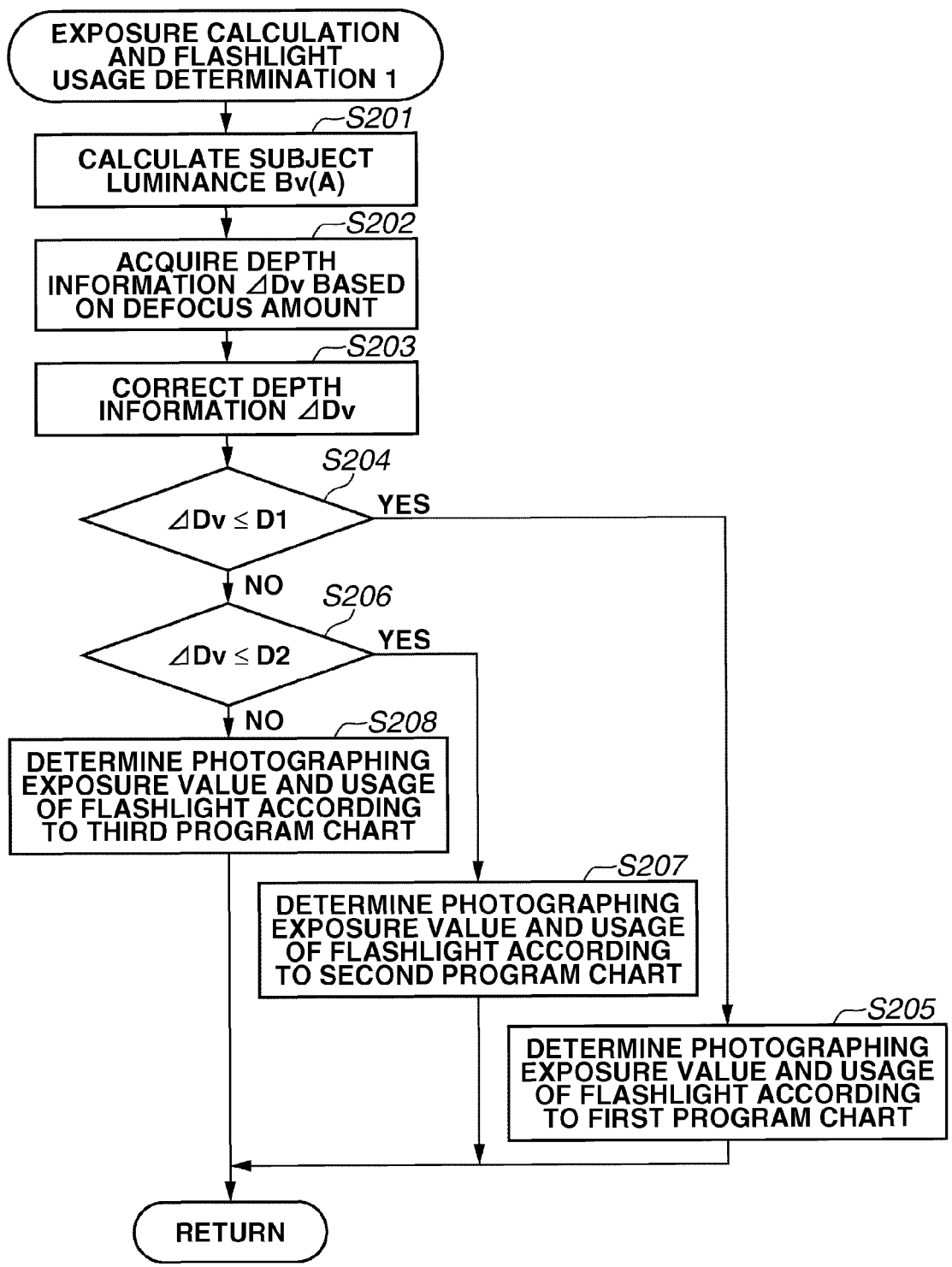
FIG. 7 is a flowchart illustrating an example of exposure calculation and flashlight usage determination processing according to an exemplary embodiment of the present invention.

In step S107, the control unit 41 calculates an exposure value based on the subject luminance information of each light metering area obtained in step S106. The control unit 41 further determines whether to perform flashlight emission. An example exposure calculation and flashlight usage determination to be performed in step S107 is described below with reference to a flowchart illustrated in FIG. 7.

First, in step S201, the control unit 41 calculates the luminance of the entire image-capturing screen by performing predetermined weighting calculation on the subject luminance information of each light metering area obtained in step S106, in which a light metering area corresponding to the focus detection area focused in step S105 is heavily weighted. The calculated luminance value is hereinafter referred to as a subject luminance $B_v(A)$.

Next, in step S202, the control unit 41 calculates depth information $\Delta D_v$ of the subject in the image-capturing screen based on the defocus amount DF(n) obtained in step S105. In this case, the depth information $\Delta D_v$ is information representing a size difference in the subject distance among a plurality of subjects existing in the image-capturing screen. If all of the subjects are located at similar positions with respect to the subject distance, the depth information $\Delta D_v$ becomes a smaller value. If two or more subjects are located at greatly different positions with respect to the subject distance, the depth information $\Delta D_v$ becomes a larger value. In the present exemplary embodiment, the subject distance represents the distance from a shooting position of the camera to the subject.

The depth information $\Delta D_v$ can be defined, for example, as a value obtained by averaging the defocus amounts of respective focus detection areas. Instead of referring to the defocus amounts of all focus detection areas, it is useful to obtain a defocus amount difference between an area in which the furthest subject is present and an area in which the closest subject is present as the depth information $\Delta D_v$. Further, it is useful to calculate the depth information $\Delta D_v$ by converting the defocus amount into an absolute distance value based on information obtained from the distance encoder 56 of the interchangeable lens 2.

In step S203, the control unit 41 corrects the depth information $\Delta Dv$ of the subject obtained in step S202. The correcting operation to be performed by the control unit 41 is described below with reference to an example illustrated in FIGS. 12A and 12B.

Figure 12A:
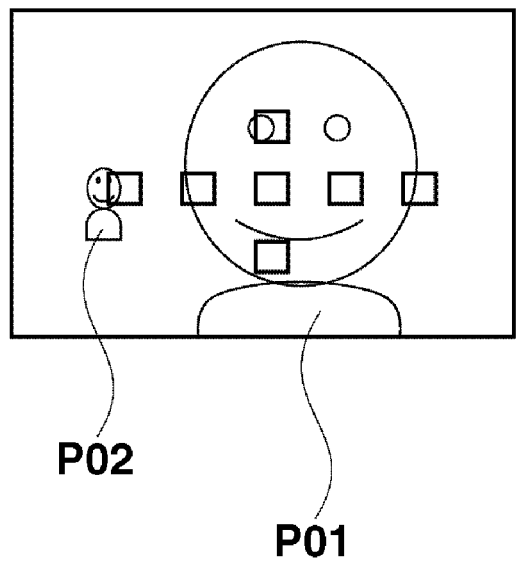
FIGS. 12A and 12B illustrate an example correction of depth information ΔDv.

A person P01 captured as a main subject and another person P02 who are simultaneously present in the image-capturing screen are illustrated in FIG. 12A. For convenience sake, the image-capturing screen illustrated in FIG. 12A includes an overlapped image of the focus detection areas S0 to S6 illustrated in FIG. 4.

According to the image illustrated in FIG. 12A, the person P01 is regarded as a main subject and the person P01 is focused through the photographic lens. The focus detection areas S0, S1, S2, S4, S5, and S6 are positioned on the image of the person P01. Therefore, the defocus amount DF(n) in these focus detection areas becomes equal to or similar to 0. On the other hand, the focus detection area S3 is positioned on the image of the person P02. A defocus amount DF(3) of the focus detection area S3 becomes a larger value because the person P02 corresponding to the focus detection area S3 is positioned farther than the person P01 corresponding to other focus detection areas.

Considering the above-described situation, if only one of a plurality of focus detection areas is greatly different from other areas in the defocus amount, the control unit 41 excludes the greatly different area in the calculation of the depth information $\Delta Dv$ to correct the depth information $\Delta Dv$. More specifically, if the difference between a particular value (i.e., one of the defocus amount DF(n)) and the remaining values is equal to or greater than a predetermined value Dth1 and if the difference between the remaining values is within a predetermined value Dth2, the control unit 41 calculates the depth information $\Delta Dv$ of the subject based on only the remaining values while excluding the particular value.

Figure 12B:
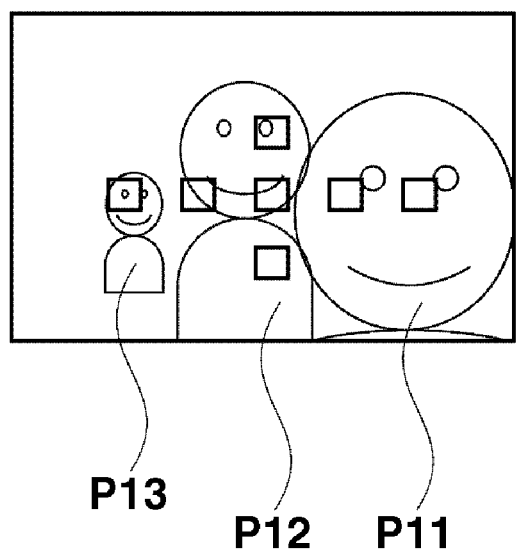

An image illustrated in FIG. 12B includes an unintended person P11 captured in the image-capturing screen in addition to the persons P12 and P13 to be captured in a shooting operation. The unintended person P11 is positioned closely to the camera. Similar to FIG. 12A, the image-capturing screen illustrated in FIG. 12B includes an overlapped image of the focus detection areas S0 to S6.

In general, the shooting magnification of a shot scene including at least one person is in a range from 0.05 to 0.01 if the image size is 24 mm×36 mm. If a shot person is positioned at a higher magnification (near distance) side or a lower magnification (far distance) side, which is not included in the above-described range, it can be regarded that such a person is not an important subject in the captured image.

Therefore, if the defocus amount of an area exceeds a predetermined value Dth3 on the near side or exceeds a predetermined value Dth4 on the far side, the control unit 41 calculates the depth information $\Delta D_v$ while regarding the defocus amount of the above-described area as being equal to the predetermined value Dth3 or the predetermined value Dth4 to reduce the effect of the area. Alternatively, in calculating the depth information $\Delta D_v$, the control unit 41 can exclude all areas whose defocus amount may exceed the predetermined value Dth3 on the near side or exceed the predetermined value Dth4 on the far side.

In step S204, the control unit 41 determines whether the calculated depth information $\Delta D_v$ is equal to or less than a first threshold D1. If it is determined that the depth information $\Delta D_v$ is equal to or less than the threshold D1 (YES in step S204), the processing proceeds to step S205.

Figure 9:
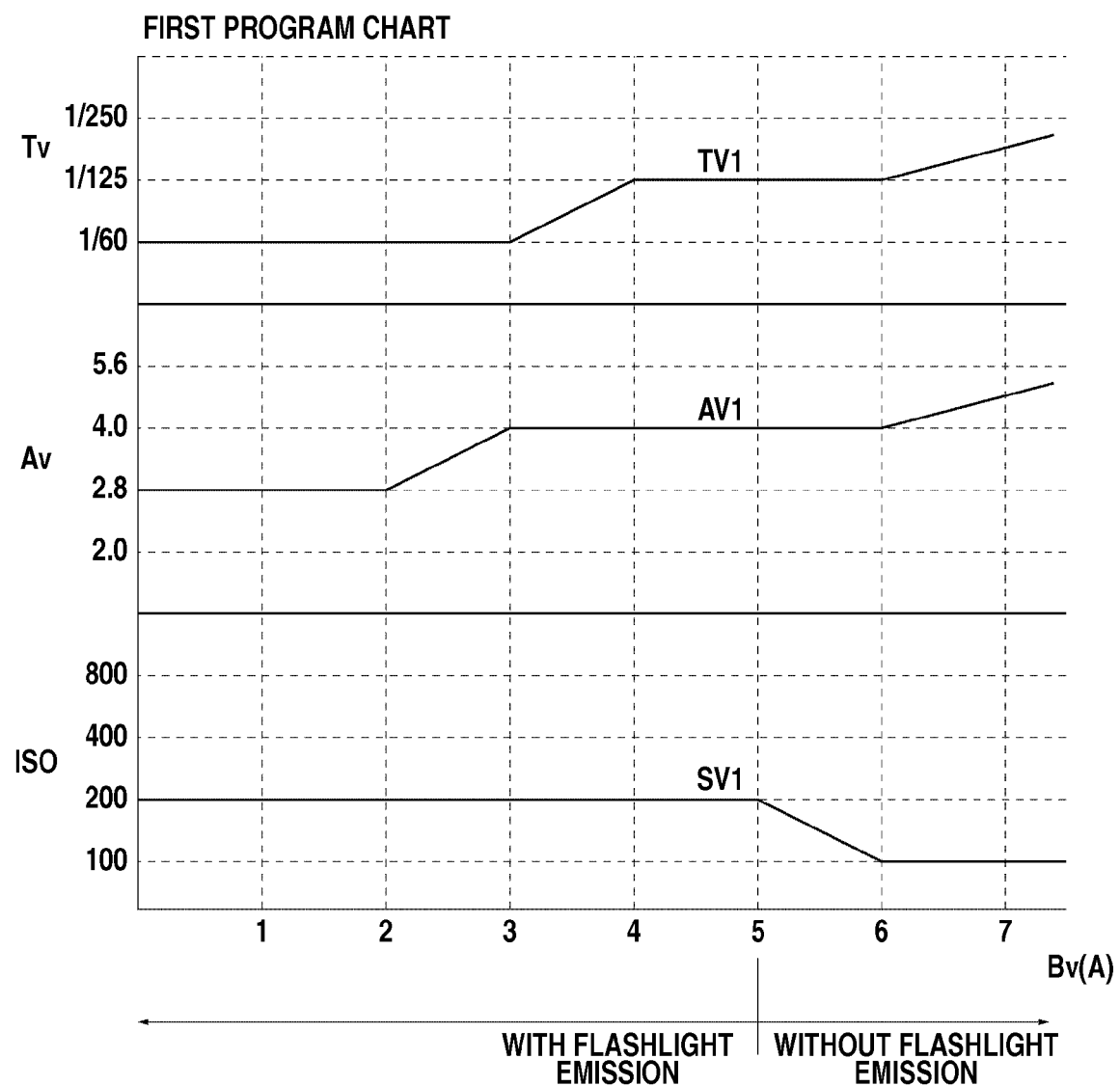
FIG. 9 illustrates a first program chart according to an exemplary embodiment of the present invention.

In step S205, the control unit 41 determines a photographing exposure value and the usage of flashlight according to a first program chart illustrated in FIG. 9, which is employable when the depth information $\Delta D_v$ is smaller. The abscissa axis of the first program chart is the subject luminance $B_v(A)$ calculated in step S201. In FIG. 9, a solid line TV1 represents a shutter speed, a solid line AV1 represents a diaphragm value, and a solid line SV1 represents a photographic sensitivity, which are automatically determined according to the subject luminance $B_v(A)$.

According to the first program chart, if the subject luminance Bv(A) is 6, an appropriate exposure can be obtained when the photographic sensitivity SV1 is equivalent to 100 (ISO sensitivity), the shutter speed is 1/125 (sec), and the diaphragm value is 4.0. If the subject luminance $B_v(A)$ is brighter than 6, an appropriate exposure can be obtained by increasing the shutter speed in increments of 0.5 steps from 1/125 (sec) and decreasing the diaphragm value in increments of 0.5 steps from 4.0 when the subject luminance $B_v(A)$ increases by 1 step while holding the photographic sensitivity SV1 at 100 (ISO sensitivity).

Under the above-described shooting conditions, it is unnecessary to use flashlight for a shooting operation because the shooting operation can be performed with natural light. If the subject luminance Bv(A) is in a range from 6 to 5, an appropriate exposure can be obtained by increasing the photographic sensitivity SV1 from 100 (ISO sensitivity) to 200 while holding the shutter speed at 1/125 (sec) and the diaphragm value at 4.0. Under the above-described shooting conditions, it is unnecessary to use flashlight for a shooting operation because the shooting operation can be performed with natural light.

If the subject luminance $B_v(A)$ is less than 5 (is less than a threshold), light emission is controlled to perform a shooting operation with flashlight while fixing the photographic sensitivity SV1 at 200 (ISO sensitivity). If the subject luminance $B_v(A)$ is in a range from 5 to 4, the shutter speed is fixed to 1/125 (sec) and the diaphragm value is fixed to 4.0. If the subject luminance $B_v(A)$ is in a range from 4 to 3, the shutter speed is changed from 1/125 (sec) to 1/60 (sec). If the subject luminance $B_v(A)$ is in a range from 3 to 2, the diaphragm value is changed from 4.0 to 2.8.

When the processing proceeds to step S205, the depth information $\Delta Dv$ of the subject is relatively smaller. In this case, it can be regarded that a plurality of subjects existing in the image-capturing screen are mutually similar in the subject distance thereof. Therefore, the control unit 41 starts a shooting operation with flashlight when the subject luminance Bv(A) exceeds 5 (a switching threshold). The threshold setting in step S205 can minimize an increase in photographic sensitivity. The switching threshold to be set in the processing of step S205 is higher than those to be set in the processing to be performed in steps S207 and S208.

Through the above-described processing in step S205, the control unit 41 can prevent the noise amount from increasing when the photographic sensitivity increases. Further, the control unit 41 can adequately set a photographing exposure value for each subject even in a case where two or more subjects are present in the image-capturing screen.

If it is determined that the depth information $\Delta Dv$ is greater than the threshold D1 (NO in step S204), the processing proceeds to step S206. In step S206, the control unit 41 determines whether the depth information $\Delta Dv$ is equal to or less than a second threshold D2. If it is determined that the depth information $\Delta D_v$ is equal to or less than the second threshold D2 (YES in step S206), the processing proceeds to step S207.

Figure 10:
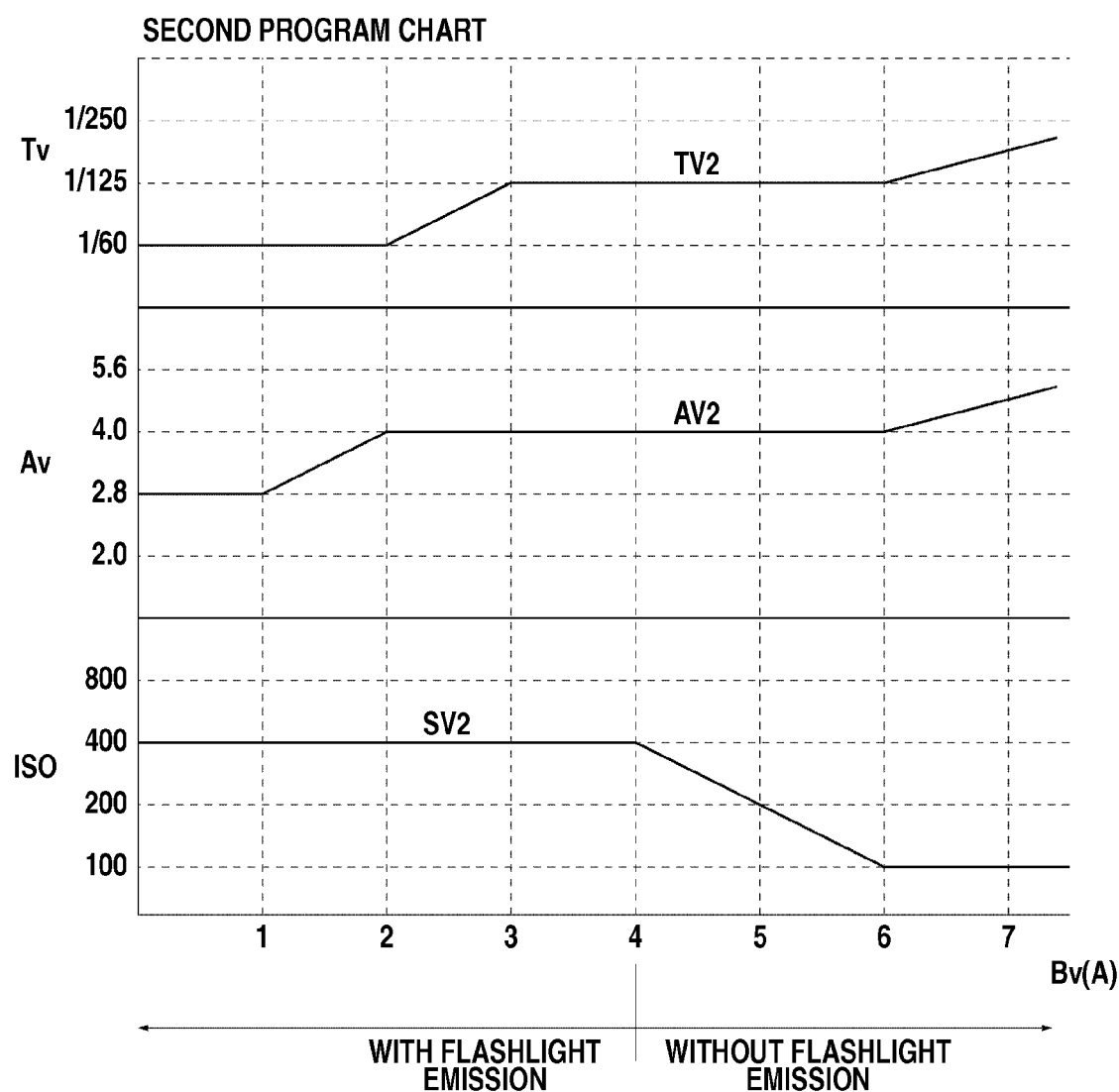
FIG. 10 illustrates a second program chart according to an exemplary embodiment of the present invention.

In step S207, the control unit 41 determines a photographing exposure value and the usage of flashlight according to a second program chart illustrated in FIG. 10, which is employable when the depth information $\Delta D_v$ is medium. The second program chart is similar to the first program chart in the definition of the abscissa axis and the ordinate axis.

According to the second program chart, if the subject luminance Bv(A) is 6, an appropriate exposure can be obtained when the photographic sensitivity SV1 is equivalent to 100 (ISO sensitivity), the shutter speed is 1/125 (sec), and the diaphragm value is 4.0. If the subject luminance $B_v(A)$ is brighter than 6, an appropriate exposure can be obtained by increasing the shutter speed in increments of 0.5 step from 1/125 (sec) and decreasing the diaphragm value in increments of 0.5 steps from 4.0 when the subject luminance $B_v(A)$ increases by 1 step while holding the photographic sensitivity SV1 at 100 (ISO sensitivity).

Under the above-described shooting conditions, it is unnecessary to use flashlight for a shooting operation because the shooting operation can be performed with natural light. If the subject luminance $B_v(A)$ is in a range from 6 to 4, an appropriate exposure can be obtained by increasing the photographic sensitivity SV1 from 100 (ISO sensitivity) to 400 while holding the shutter speed at 1/125 (sec) and the diaphragm value at 4.0. Under the above-described shooting conditions, it is unnecessary to use flashlight for a shooting operation because the shooting operation can be performed with natural light.

If the subject luminance $B_v(A)$ is less than 4, light emission is controlled to perform a shooting operation with flashlight while fixing the photographic sensitivity SV1 at 400 (ISO sensitivity). If the subject luminance $B_v(A)$ is in a range from 4 to 3, the shutter speed is fixed to 1/125 (sec) and the diaphragm value is fixed to 4.0. If the subject luminance $B_v(A)$ is in a range from 3 to 2, the shutter speed is changed from 1/125 (sec) to 1/60 (sec). If the subject luminance $B_v(A)$ is in a range from 2 to 1, the diaphragm value is changed from 4.0 to 2.8.

When the processing proceeds to step S207, the depth information $\Delta D_v$ of the subject is medium. In this case, it can be regarded that a plurality of subjects existing in the image-capturing screen are slightly different from each other in the subject distance thereof.

Accordingly, the control unit 41 increases the photographic sensitivity to 400, and starts a shooting operation with flashlight when the subject luminance $B_v(A)$ is equal to or less than 4 (i.e. the switching threshold). In other words, the control unit 41 performs switching at another subject luminance level, which is darker by 1 step than the level employed when the depth information $\Delta D_v$ is smaller (see the first program chart). More specifically, the luminance range in which the shooting operation is performed with natural light is wider compared to the case where the depth information $\Delta D_v$ is smaller.

The above-described processing enables users to perform shooting operations with natural light (i.e., light having the same color temperature) for not only a subject positioned on the near side but also a subject positioned on the far side. Therefore, the above-described processing can prevent unnatural color reproduction that may occur when the white balance control is performed to eliminate the color temperature difference of illumination light.

Further, as the shooting operation is performed in a state where both a subject positioned on the near side and a subject positioned on the far side are illuminated with natural light, images of the near side subject and the far side subject can be captured to have similar brightness.

Further, by increasing the photographic sensitivity during the emission of flashlight, the imaging apparatus according to the present exemplary embodiment can capture a bright image of a subject positioned on the far side (which is not sufficiently illuminated with flashlight) with natural light even when the subject luminance is darker.

If it is determined that the depth information $\Delta D_v$ of the subject is greater than the second threshold D2 (NO in step S206), the processing proceeds to step S208.

Figure 11:
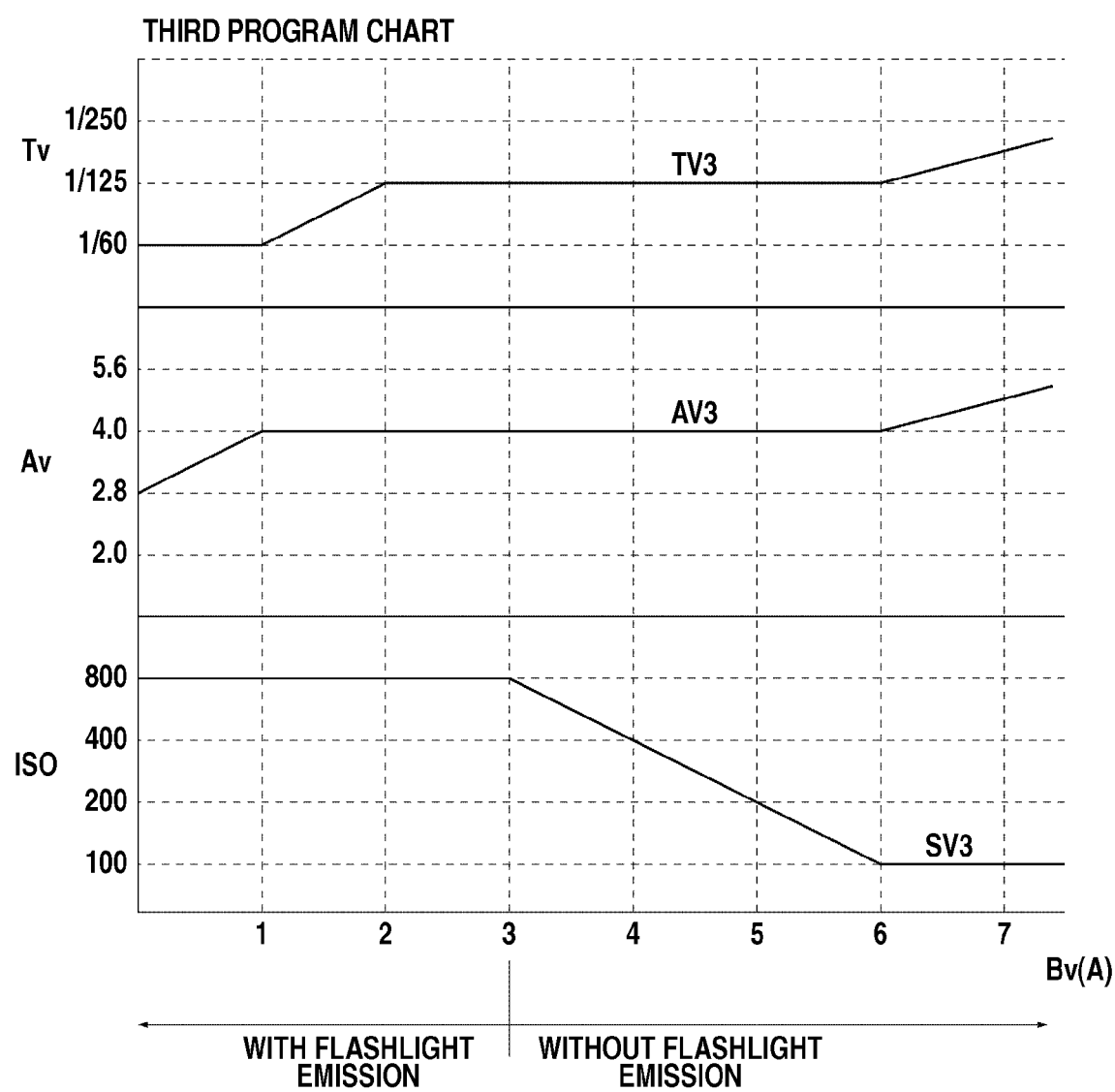
FIG. 11 illustrates a third program chart according to an exemplary embodiment of the present invention.

In step S208, the control unit 41 determines a photographing exposure value and the usage of flashlight emission according to a third program chart illustrated in FIG. 11, which is employable when the depth information $\Delta D_v$ is larger. The third program chart is similar to the first program chart in the definition of the abscissa axis and the ordinate axis.

According to the third program chart, if the subject luminance $B_v(A)$ is 6, an appropriate exposure can be obtained when the photographic sensitivity SV1 is equivalent to 100 (ISO sensitivity), the shutter speed is $1/125$ (sec), and the diaphragm value is 4.0. If the subject luminance $B_v(A)$ is brighter than 6, an appropriate exposure can be obtained by increasing the shutter speed in increments of 0.5 steps from $1/125$ (sec) and decreasing the diaphragm value in increments of 0.5 steps from 4.0 when the subject luminance $B_v(A)$ increases by 1 step while holding the photographic sensitivity SV1 at 100 (ISO sensitivity). Under the above-described shooting conditions, it is unnecessary to use flashlight for a shooting operation because the shooting operation can be performed with natural light.

If the subject luminance $B_v(A)$ is in a range from 6 to 3, an appropriate exposure can be obtained by increasing the photographic sensitivity SV1 from 100 (ISO sensitivity) to 800 while holding the shutter speed at $1/125$ (sec) and the diaphragm value at 4.0. Under the above-described shooting conditions, it is unnecessary to use flashlight for a shooting operation because the shooting operation can be performed with natural light.

If the subject luminance $B_v(A)$ is less than 3, light emission is controlled to perform a shooting operation with flashlight while fixing the photographic sensitivity SV1 at 800 (ISO sensitivity). If the subject luminance $B_v(A)$ is in a range from 3 to 2, the shutter speed is fixed to $1/125$ (sec) and the diaphragm value is fixed to 4.0. If the subject luminance $B_v(A)$ is in a range from 2 to 1, the shutter speed is changed from $1/125$ (sec) to $1/60$ (sec). If the subject luminance $B_v(A)$ is in a range from 1 to 0, the diaphragm value is changed from 4.0 to 2.8.

When the processing proceeds to step S208, the depth information $\Delta D_v$ of the subject is larger. Therefore, it can be regarded that a plurality of subjects existing in the image-capturing screen are greatly different from each other in the subject distance thereof.

Accordingly, the control unit 41 increases the photographic sensitivity to 800, and starts a shooting operation with flashlight when the subject luminance $B_v(A)$ is equal to or less than 3 (i.e. the switching threshold). In other words, the control unit 41 performs switching at another subject luminance level, which is darker by one more step than the level employed when the depth information $\Delta D_v$ is medium (see the second program chart). More specifically, the luminance range in which the shooting operation is performed with natural light is wider compared to the case where the depth information $\Delta D_v$ is medium.

The above-described processing enables users to perform shooting operations with natural light (i.e., light having the same color temperature) for not only a subject positioned on the near side but also a subject positioned on the far side. Therefore, the above-described processing can prevent unnatural color reproduction that may occur when the white balance control is performed to eliminate the color temperature difference of illumination light.

Further, as the shooting operation is performed in a state where both a subject positioned on the near side and a subject positioned on the far side are illuminated with natural light, images of the near side subject and the far side subject can be captured to have similar brightness.

Further, by increasing the photographic sensitivity when the emission of flashlight is performed compared to the case where the depth information $\Delta D_v$ is medium, the imaging apparatus according to the present exemplary embodiment can capture a bright image of a subject positioned on the far side (which is not sufficiently illuminated with flashlight) with natural light even when the subject luminance is darker.

Figure 6:
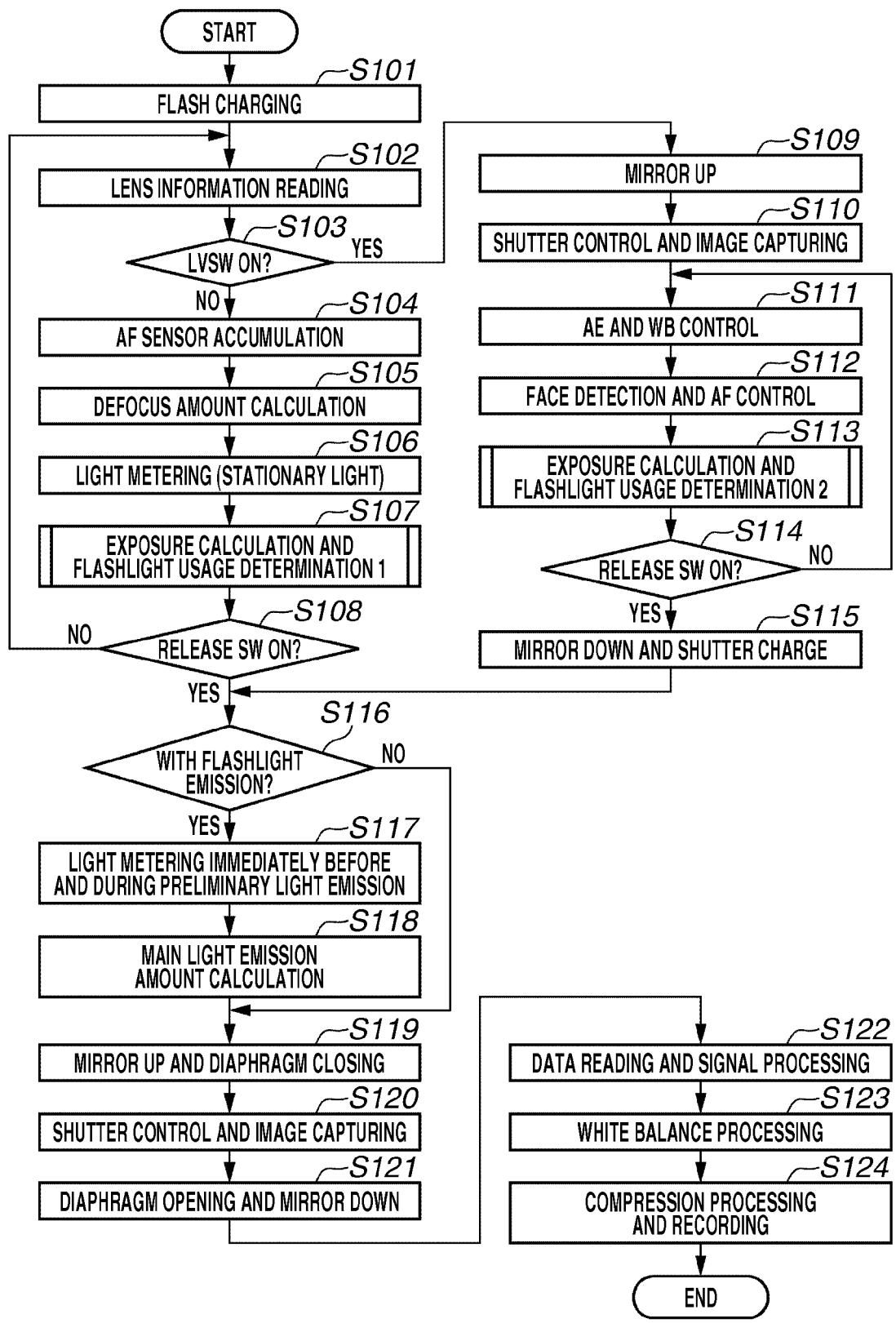
FIG. 6 is a flowchart illustrating an example sequence of an operation that can be performed by a camera according to an exemplary embodiment of the present invention.

If the processing in step S205, step S207, or step S208 is completed according to the size of the depth information $\Delta D_v$, i.e., when the determination of the photographic sensitivity, the shutter speed, the diaphragm value, and the usage of flashlight emission with respect to the subject luminance $B_v(A)$ is completed, the processing returns to the flowchart illustrated in FIG. 6.

As described above, through the processing of step S205, step S207, or step S208, the control unit 41 is functionally operable as a light emission control unit configured to control the flashlight device to emit light for shooting operation if the subject luminance is less than a threshold. Further, the control unit 41 changes the threshold according to a difference in the subject distance among a plurality of areas. The threshold is set to be smaller when the difference in the subject distance is large.

Further, the control unit 41 is functionally operable as a setting unit configured to set a higher upper-limit value of the photographic sensitivity to be set as a threshold to determine whether to execute a shooting operation without using light emission by the flashlight device when the subject distance difference is large.

If the determination with respect to the exposure calculation and the flashlight usage in step S107 (see FIG. 6) is completed, then in step S108, the control unit 41 determines whether the release switch 49 is turned on. If the release switch 49 is not turned on for a predetermined time (NO in step S108), the processing returns to step S102 and the control unit 41 repeats the above-described steps. If the release switch 49 is turned on (YES in step S108), the processing proceeds to step S116.

If it is determined that the live view start switch 50 is turned on (YES in step S103), the processing proceeds to step S109. In step S109, the control unit 41 outputs a control signal to the first motor driver 47 to drive the first motor 48. The first motor 48 moves the main mirror 13 and the first reflection mirror 14 upward.

Next, in step S110, the control unit 41 outputs a control signal to the shutter driving unit 42. The shutter driving unit 42 brings the shutter 10 into an opened state. Thus, incident light from the photographic lens reaches the image sensor 12 to enable the image sensor 12 to perform an image capturing operation. Subsequently, the control unit 41 outputs an instruction to the signal processing circuit 43 to cause the image sensor 12 to perform an image capturing operation. When the image sensor 12 starts the image capturing operation, the control unit 41 successively displays images periodically obtained from the image sensor 12 on the display unit 45. In other words, the control unit 41 starts a live view operation.

In step S111, the control unit 41 acquires luminance information and color information of each screen portion from captured image data and corrects the electric charge accumulation time and the color processing so that a live view image to be displayed on the display unit 45 is appropriate in brightness and tint.

In step S112, the control unit 41 performs subject face detection processing based on image data. The face detection processing includes extracting feature edges of eyes and a mouth from the image data to detect a human face position. Further, the face detection processing includes detecting a contour encompassing the eyes and the mouth to obtain a centroid position of the face and calculating a luminance value of the area encompassed by the contour.

Further, the face detection processing includes obtaining positional information of the face detected in the image-capturing screen based on the calculated centroid position, and obtaining face size information based on the contour information. If two or more faces are present in the screen, the control unit 41 obtains positional information and size information of each face area. In the present exemplary embodiment, FP(m) represents positional information of each detected face area and FS(m) represents size information, in which "m" is a natural number indicating the total number of detected face areas.

The size information of a plurality of face areas obtained in this manner is information relating to subject distances of a plurality of areas. Therefore, the control unit 41 acquires information relating to a plurality of subject distances by executing the processing of step S112.

Further, in step S112, the control unit 41 determines a main subject based on the positional information and size information of the obtained face areas. The control unit 41 outputs a lens driving command to the lens control unit 51 to perform a focus adjustment operation for bringing the photographic lens into an in-focus state for the main subject. In this manner, the control unit 41 is functionally operable as a determination unit configured to identify a main subject among a plurality of subjects.

The lens control unit 51 outputs a control signal to the second motor driver 52 to drive the second motor 53. The second motor 53 moves the focus adjustment lens according to the control signal. The control unit 41 outputs a lens driving command to the lens control unit 51 so that the lens stops at a position where a contrast value of image information can be maximized.

Through the above-described processing, the photographic lens is brought into the in-focus state for the main subject. In this case, information to be obtained by the distance encoder 56 changes in accordance with the movement of the focus adjustment lens. Therefore, the control unit 41 can update various lens information.

Figure 8:
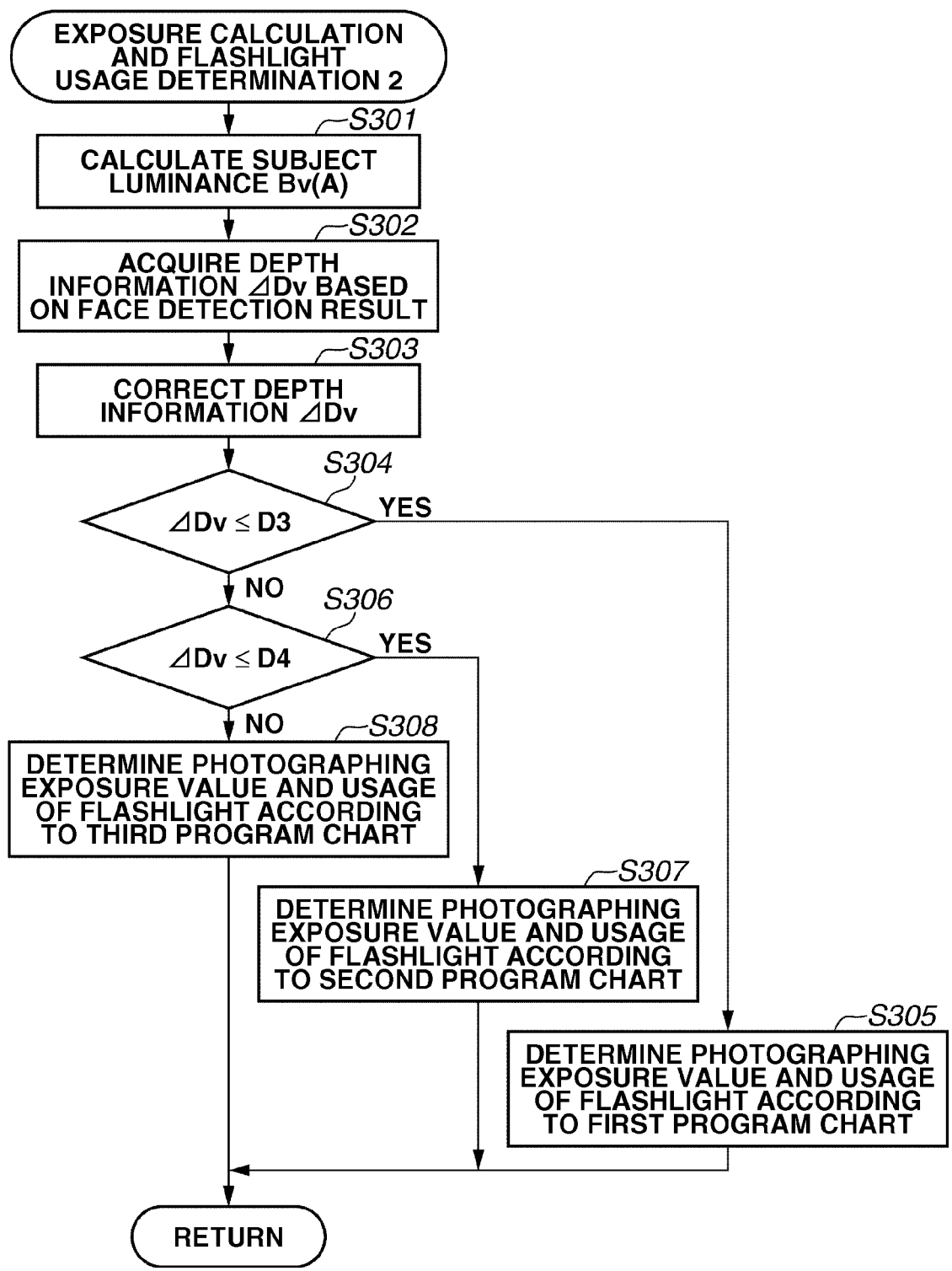
FIG. 8 is a flowchart illustrating an example of exposure calculation and flashlight usage determination processing according to an exemplary embodiment of the present invention.

In step S113, the control unit 41 calculates an exposure value for a main shooting operation and determines whether to perform flashlight emission. An example exposure calculation and flashlight usage determination to be performed in step S113 is described below with reference to a flowchart illustrated in FIG. 8.

First, in step S301, the control unit 41 calculates the luminance of the entire image-capturing screen by performing predetermined weighting calculation on the subject luminance information of each light metering area of the image-capturing screen, in which a light metering area corresponding to the focus detection area focused in step S111 is heavily weighted. The calculated luminance value is hereinafter referred to as a subject luminance $B_v(A)$.

Next, in step S302, the control unit 41 calculates the depth information $\Delta D_v$ of the subject based on the face size information FS(m) obtained in step S112. In general, the difference in face size among various persons is negligible although the face size is slightly different due to age and individual differences. If there is a significant size difference between two faces included in a captured image, it can be regarded that these faces are mutually different in the subject distance.

Accordingly, in step S302, the control unit 41 calculates the depth information $\Delta D_v$ of the subject based on a difference between a maximum value and a minimum value of the face size information FS(m). Alternatively, the control unit 41 can calculate a standard deviation or a variance of the face size information FS(m) according to a statistical method. Further, the control unit 41 can convert the face size information FS(m) into a subject distance value with reference to the focal distance of the photographic lens before calculating the depth information $\Delta D_v$ of the subject.

In step S303, the control unit 41 corrects the depth information $\Delta D_v$ of the subject obtained in step S302. The correcting operation to be performed by the control unit 41 is described below with reference to an example illustrated in FIGS. 13A and 13B.

Figure 13A:
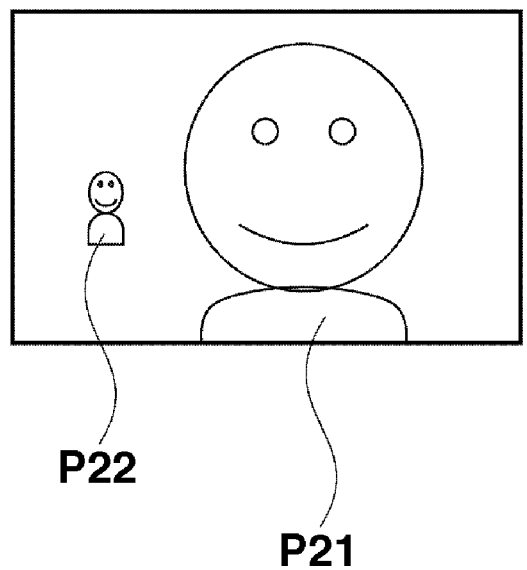
FIGS. 13A and 13B illustrate an example correction of the depth information ΔDv.

An image illustrated in FIG. 13A includes a person P21 captured as a main subject and an unintended person P22, who are simultaneously present in the image-capturing screen. In FIG. 13A, FP(1) represents positional information and FS(1) represents size information of a face corresponding to the person P21. Further, FP(2) represents positional information and FS(2) represents size information of a face corresponding to the person P22.

The size information FS(1) and FS(2) of two faces are greatly different. Therefore, if the face size information FS(1) and FS(2) are simply used to calculate the depth information $\Delta D_v$, a calculated value becomes a larger value. Hence, if there is a face subject positioned in a peripheral region of the image-capturing screen and sufficiently smaller in size compared to the main subject, the control unit 41 excludes this face subject in the calculation of the depth information $\Delta D_v$ to correct the depth information $\Delta D_v$.

More specifically, in calculating the depth information $\Delta D_v$, the control unit 41 excludes particular face detection information if the concerned subject is positioned in the peripheral region of the image-capturing screen relative to the focused person P21 (i.e., the face positional information FP(1)) and if the difference relative to the face size information FS(1) is equal to or greater than a predetermined value Fth1.

Figure 13B:
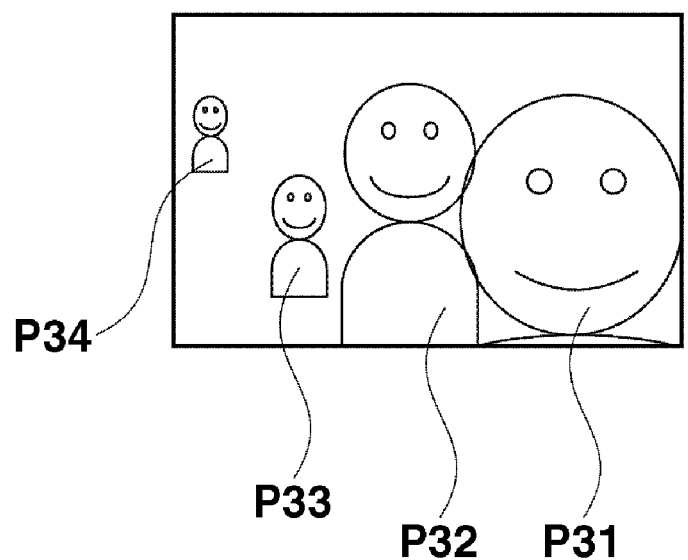

An image illustrated in FIG. 13B includes persons P32 and P33 to be captured as two main subjects and unintended persons P31 and P34, who are simultaneously present in the image-capturing screen. The unintended person P31 is positioned on the near side and the other unintended person P34 is positioned on the far side relative to the main subject persons P32 and P33.

As described above, in general, the shooting magnification of a shot scene including at least one person is in a range from 0.05 to 0.01 if the image size is 24 mm×36 mm. If a shot person is positioned at a higher magnification (near distance) side or a lower magnification (far distance) side, which is not included in the above-described range, it can be regarded that the concerned person is not an important subject for the captured image.

Therefore, if the face size information FS(m) of a person is equal to or greater than a predetermined value Fth2 or less than a predetermined value Fth3, the control unit 41 calculates the depth information $\Delta D_v$, while regarding the face size information FS(m) of the concerned person as being equal to the predetermined value Fth2 or Fth3. Alternatively, in calculating the depth information $\Delta D_v$, the control unit 41 can exclude all persons whose face size information FS(m) may be greater than the predetermined value Fth2 or less than the predetermined value Fth3.

In step S304, the control unit 41 determines whether the calculated depth information $\Delta D_v$ is equal to or less than a third threshold D3. If it is determined that the depth information $\Delta D_v$ is equal to or less than the third threshold D3 (YES in step S304), the processing proceeds to step S305.

In step S305, the control unit 41 determines a photographing exposure value and the usage of flashlight according to the first program chart illustrated in FIG. 9, which is employable when the depth information $\Delta D_v$ is smaller. The photographing exposure and flashlight usage determination processing to be performed in step S305 is similar to the processing in step S205 except for the subject luminance $B_v(A)$ calculated in step S301, and its detailed description is not repeated.

When the processing proceeds to step S305, the depth information $\Delta D_v$ of the subject is relatively smaller. In this case, it can be regarded that a plurality of subjects existing in the image-capturing screen are mutually similar in the subject distance thereof. Therefore, the control unit 41 starts a shooting operation with flashlight when the subject luminance $B_v(A)$ is equal to or less than 5 (the switching threshold). The threshold setting in step S305 can minimize an increase in photographic sensitivity. The switching threshold to be set in the processing of step S305 is higher than those to be set in the processing to be performed in steps S307 and S308.

Through the above-described processing in step S305, the control unit 41 can prevent the noise amount from increasing when the photographic sensitivity increases. Further, the control unit 41 can adequately set a photographing exposure value for each subject even in a case where two or more subjects are present in the image-capturing screen.

If it is determined that the calculated depth information $\Delta D_v$ is greater than the threshold D3 (NO in step S304), the processing proceeds to step S306. In step S306, the control unit 41 determines whether the depth information $\Delta D_v$ is equal to or less than a fourth threshold D4. If it is determined that the depth information $\Delta D_v$ is equal to or less than the fourth threshold D4 (YES in step S306), the processing proceeds to step S307.

In step S307, the control unit 41 determines a photographing exposure value and the usage of flashlight according to the second program chart illustrated in FIG. 10, which is employable when the depth information $\Delta D_v$ is medium. The photographing exposure and flashlight usage determination processing to be performed in step S307 is similar to the processing in step S207 except for the subject luminance $B_v(A)$ calculated in step S301, and its detailed description is not repeated.

When the processing proceeds to step S307, the depth information $\Delta D_v$ of the subject is medium. In this case, it can be regarded that a plurality of subjects existing in the image-capturing screen are slightly different from each other in the subject distance thereof. Accordingly, the control unit 41 increases the photographic sensitivity to 400 and starts a shooting operation with flashlight when the subject luminance $B_v(A)$ is equal to or less than 4 (i.e. the switching threshold). In other words, the control unit 41 performs switching at another subject luminance level, which is darker by 1 step than the level employed when the depth information $\Delta D_v$ is smaller (see the first program chart). More specifically, the luminance range in which the shooting operation is performed with natural light is wider compared to the case where the depth information $\Delta D_v$ is smaller.

The above-described processing enables users to perform shooting operations with natural light (i.e., light having the same color temperature) for not only a subject positioned on the near side but also a subject positioned on the far side. Therefore, the above-described processing can prevent unnatural color reproduction that may occur when the white balance control is performed to eliminate the color temperature difference of illumination light.

Further, as the shooting operation is performed in a state where both a subject positioned on the near side and a subject positioned on the far side are illuminated with natural light, images of the near side subject and the far side subject can be captured to have similar brightness.

Further, by increasing the photographic sensitivity during the emission of flashlight, the imaging apparatus according to the present exemplary embodiment can capture a bright image of a subject positioned on the far side (which is not sufficiently illuminated with flashlight) with natural light even when the subject luminance is darker.

If it is determined that the depth information $\Delta D_v$ is greater than the threshold D4 (NO in step S306), the processing proceeds to step S308.

In step S308, the control unit 41 determines a photographing exposure value and the usage of flashlight according to the third program chart illustrated in FIG. 11, which is employable when the depth information $\Delta Dv$ is larger. The photographing exposure and flashlight usage determination processing to be performed in step S308 is similar to the processing in step S208 except for the subject luminance $Bv(A)$ calculated in step S301, and its detailed description is not repeated.

When the processing proceeds to step S308, the depth information $\Delta D_v$ of the subject is large. Therefore, it can be regarded that a plurality of subjects existing in the image-capturing screen are greatly different from each other in the subject distance thereof.

Accordingly, the control unit 41 increases the photographic sensitivity to 800, and starts a shooting operation with flashlight when the subject luminance $B_v(A)$ is equal to or less than 3. In other words, the control unit 41 performs switching at another subject luminance level, which is darker by one more step than the level employed when the depth information $\Delta D_v$ is medium (see the second program chart). More specifically, the luminance range in which the shooting operation is performed with natural light is wider compared to the case where the depth information $\Delta D_v$ is medium.

The above-described processing enables users to perform shooting operations with natural light (i.e., light having the same color temperature) for not only a subject positioned on the near side but also a subject positioned on the far side. Therefore, the above-described processing can prevent unnatural color reproduction that may occur when the white balance control is performed to eliminate the color temperature difference of illumination light.

Further, as the shooting operation is performed in a state where both a subject positioned on the near side and a subject positioned on the far side are illuminated with natural light, images of the near side subject and the far side subject can be captured to have similar brightness.

Further, by increasing the photographic sensitivity during the emission of flashlight compared to the case where the depth information $\Delta Dv$ is medium, the imaging apparatus according to the present exemplary embodiment can capture a bright image of a subject positioned on the far side (which is not sufficiently illuminated with flashlight) with natural light even when the subject luminance is darker.

If the processing in step S305, step S307, or step S308 is completed according to the size of the depth information $\Delta Dv$, i.e., when the determination of the photographic sensitivity, the shutter speed, the diaphragm value, and the usage of flashlight emission with respect to the subject luminance $B_v(A)$ is completed, the processing returns to the flowchart illustrated in FIG. 6.

If the determination with respect to the exposure calculation and the flashlight usage is completed, then in step S114, the control unit 41 determines whether the release switch 49 is turned on. If the release switch 49 is not turned on for a predetermined time (NO in step S114), the processing returns to step S111 and the control unit 41 repeats the above-described processing. If the release switch 49 is turned on (YES in step S114), the processing proceeds to step S115.

In step S115, the control unit 41 outputs a control signal to the shutter driving unit 42 to close the shutter 10 and terminates the live view operation. Subsequently, the control unit 41 outputs a control signal to the first motor driver 47 to drive the first motor 48. The first motor 48 moves the main mirror 13 and the first reflection mirror 14 downward from their uppermost positions. Further, the first motor driver 47 charges the mechanical shutter 10.

In step S116, the control unit 41 checks whether the determination result in step S107 or step S113 indicates a shooting operation to be performed with flashlight. If it is determined that the determination result in step S107 or step S113 indicates the shooting operation with flashlight (YES in step S116), the processing proceeds to step S117.

In step S117, the control unit 41 performs A/D conversion processing on signals read from the light metering areas PD1 to PD35 (i.e., 35 divided light metering areas) of the light metering sensor 26 to input luminance information of each portion of the image-capturing screen immediately before preliminary light emission. In the following description, P(i) represents luminance information of each light metering area obtained immediately before the preliminary light emission.

Subsequently, the control unit 41 communicates with the flashlight control unit 61 to instruct preliminary flashlight emission. In response to the received instruct, the flashlight control unit 61 causes the xenon tube 34 to emit light based on an output signal of the monitor sensor 37 so that a light emission amount of the xenon tube 34 is equalized with a predetermined preliminary light emission amount.

To obtain subject luminance information during the preliminary light emission, the control unit 41 performs A/D conversion processing on signals read from the light metering areas PD1 to PD35 (i.e., 35 divided light metering areas) of the light metering sensor 26 to input luminance information of each portion of the image-capturing screen during the preliminary light emission. In the following description, H(i) represents luminance information of each light metering area obtained during the preliminary light emission. Further, "i" of P(i) and H(i) is a parameter identifying a corresponding one of 35 divided light metering areas.

In step S118, the control unit 41 performs calculation to determine a main light emission amount of the flashlight device. An example calculation method for determining the main light emission amount based on the luminance information P(i) of each light metering area obtained immediately before the preliminary light emission and the luminance information H(i) of each light metering area obtained during the preliminary light emission is discussed, for example, in Japanese Patent Application Laid-Open No. 2005-275265, and its detailed description is omitted If it is determined that the shooting operation with flashlight is not to be performed (NO in step S116), the processing proceeds to step S119 without executing the processing in steps S117 and S118.

In step 119, the control unit 41 outputs a control signal to the first motor driver 47 to drive the first motor 48. The first motor 48 moves the main mirror 13 and the first reflection mirror 14 upward. Subsequently, the control unit 41 outputs information relating to the diaphragm value calculated in step S107 or step S113 to the lens control unit 51.

Based on the information supplied from the control unit 41, the lens control unit 51 outputs a control signal to the third motor driver 54 to drive the third motor 55. The third motor 55 moves the diaphragm 31. Through the processing in step S119, the diaphragm 31 of the photographic lens is brought into a closed state.

In step S120, the control unit 41 outputs a control signal to the shutter driving unit 42 to bring the shutter 10 into an opened state. Thus, the image sensor 12 can receive incident light from the photographic lens for image capturing. Then, the control unit 41 outputs an instruction to the signal processing circuit 43 so that the image sensor 12 can perform image capturing according to the shutter speed calculated in step S107 or step S113.

Further, in a case where a shooting operation with flashlight is performed, the control unit 41 outputs a flashlight emission instruction to the flashlight control unit 61 in synchronization with the image capturing timing. According to the flashlight emission instruction, the flashlight control unit 61 causes the xenon tube 34 to emit light based on an output signal of the monitor sensor 37 so that the light emission amount of the xenon tube 34 is equalized with the main light emission amount calculated in step S117.

Thus, the camera can perform a shooting operation with flashlight emission. If the shooting operation terminates, the control unit 41 outputs a signal to the shutter driving unit 42 to bring the shutter 10 into a light-shielding state. Thus, the light from the photographic lens can be prevented from reaching the image sensor 12.

In step S121, the control unit 41 outputs diaphragm control information to the lens control unit 51 so as to open the diaphragm 31. According to the diaphragm control information, the lens control unit 51 outputs a control signal to the third motor driver 54 to drive the third motor 55. The third motor 55 opens the diaphragm 31. Thus, the photographic lens is brought into a diaphragm opened state.

Further, the control unit 41 outputs a control signal to the first motor driver 47 to drive the first motor 48. The first motor 48 moves the main mirror 13 and the first reflection mirror 14 downward.

In step S122, the control unit 41 performs A/D conversion on image data read from the image sensor 12, and outputs an instruction to the signal processing circuit 43 to perform required correction processing and interpolation processing.

In step S123, the control unit 41 outputs an instruction to the signal processing circuit 43 to perform white balance processing on image data. More specifically, the control unit 41 divides one screen of image data into a plurality of areas, and extracts a white color area of the subject based on a color difference signal of each divided area. Further, based on the signal of the extracted area, the control unit 41 corrects the gains of red channels and blue channels in the entire screen to perform white balance adjustment processing on the image data.

In step S124, the control unit 41 outputs an instruction to the signal processing circuit 43 to compress and convert the white balance adjusted image data into a predetermined recording file format, and stores the compressed and converted image data in the storage device 46. Thus, the control unit 41 terminates sequential image capturing processing.

As described above, in a case where the depth information $\Delta D_v$ of the subject is smaller in size, switching to the shooting operation with flashlight responding to a darker subject luminance is performed at a relatively low sensitivity (i.e., when the subject luminance is relatively high). The above-described processing can prevent the noise amount from increasing when the photographic sensitivity increases and can adequately set a photographing exposure value for each subject even in a case where two or more subjects are present in the image-capturing screen.

On the other hand, in a case where the depth information $\Delta D_v$ of the subject is larger in size, switching to the shooting operation with flashlight responding to a darker subject luminance is performed at a relatively high sensitivity (i.e., when the subject luminance is relatively low). More specifically, in a case where the depth information (indicating the size difference in the subject distance among a plurality of subjects existing in the image-capturing screen) is larger, the threshold of the subject luminance to be referred to when performing a shooting operation with light emission by the illumination device is set to be lower. A higher upper-limit value of the photographic sensitivity is set as a threshold to be referred to when determining whether to execute a shooting operation without using light emission by the illumination device.

The above-described processing enables users to perform shooting operations with natural light (i.e., light having the same color temperature) for not only a subject positioned on the near side but also a subject positioned on the far side. Therefore, the above-described processing can prevent unnatural color reproduction that may occur when the white balance control is performed to eliminate the color temperature difference of illumination light.

Further, as the shooting operation is performed in a state where both a subject positioned on the near side and a subject positioned on the far side are illuminated with natural light, images of the near side subject and the far side subject can be captured to have similar brightness.

Further, by increasing the photographic sensitivity when the emission of flashlight is performed, the imaging apparatus according to the present exemplary embodiment can capture a bright image of a subject positioned on the far side (which is not sufficiently illuminated with flashlight) with natural light even when the subject luminance is darker.

According to the above-described switching configuration, one of three program charts is selected according to the size of the depth information $\Delta D_v$ of the subject. However, the switching configuration according to the present exemplary embodiment is not limited to the above-described example. Another exemplary embodiment may employ a different configuration capable of lowering the threshold of the subject luminance to be referred to when switching to the shooting operation with flashlight (i.e., increasing the photographic sensitivity) when the depth information $\Delta D_v$ of the subject is large in size.

For example, it is useful to prepare three or more program charts to be used for the above-described switching operation. It is also useful to continuously change program chart based on calculation. Further, it is useful to perform switching between two program charts based on a determination whether the depth information $\Delta D_v$ of the subject is equal to or greater than a predetermined value in size.

Further, the shutter speed, the diaphragm value, the photographic sensitivity, and the switching threshold of the subject luminance to be referred to when determining the usage of flashlight in a shooting operation, which are data defined beforehand in each program chart, are not limited to the above-described examples.

Further, in the present exemplary embodiment, the method for acquiring the depth information $\Delta D_v$ from the defocus amount DF(n) of each focus detection area of the image-capturing screen and the method for acquiring the depth information $\Delta D_v$ from the face size information FS (m) detected through the face detection processing are described as example methods. However, the method for acquiring the depth information $\Delta D_v$ for each of a plurality of subjects that are present in the image-capturing screen is not limited to the above-described methods.

For example, it is useful to employ a method capable of calculating the depth information $\Delta D_v$ of each subject in the image-capturing screen based on luminance information obtainable from each light metering area of the image-capturing screen when the flashlight is not used and luminance information obtainable when the flashlight is used. Further, it is useful to combine all of the above-described methods.

For example, the above-described method can be executed in step S107 or step S113 in a case where obtained reliability of the defocus amount DF(n) of each focus detection area is low because of low luminance or low contrast of the subject or in a case where the face detection is unfeasible.

Further, the present exemplary embodiment is not limited to a still image shooting operation. For example, the above-described processing can be applied to a moving image shooting operation. For example, if the depth information of a subject in the image-capturing screen is larger when a moving image shooting operation is performed, it is useful to lower the threshold of the subject luminance to be referred to when determining whether to use light emission by an illumination device (e.g., a video light) and increase the upper-limit value of the photographic sensitivity to be set as a threshold when determining whether to execute a shooting operation without using light emission by the illumination device.

Further, instead of increasing the upper-limit value of the photographic sensitivity to be referred to when determining whether to execute a shooting operation without using light emission by the illumination device, it may be useful to decrease a lower-limit value of the diaphragm value (i.e., widen an upper-limit aperture diameter of the diaphragm) or decrease the lowest shutter speed (i.e., increase the longest exposure time).

Further, the present invention can be realized by executing the following processing. More specifically, the processing includes supplying a software (computer) program capable of realizing the functions of the above-described exemplary embodiments to a system or an apparatus via a network or an appropriate recording medium. The processing further includes enabling a computer (or a central processing unit (CPU) or a microprocessor unit (MPU)) incorporated in the system or the apparatus to read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-247886 filed Oct. 28, 2009, which is hereby incorporated by reference herein in its entirety.

What is claimed is:

1. An imaging apparatus that can perform a shooting operation with an illumination device, comprising:
   a light metering unit configured to measure a subject luminance;
   an acquisition unit configured to acquire information relating to subject distances of a plurality of areas; and
   a light emission control unit configured to cause the illumination device to emit light in a shooting operation if the subject luminance measured by the light metering unit is less than a threshold value,
   wherein the light emission control unit is configured to change the threshold value according to a difference among the plurality of areas in subject distance based on the information acquired by the acquisition unit.

2. The imaging apparatus according to claim 1, wherein the light emission control unit is configured to reduce the threshold value when the difference among the plurality of areas in subject distance increases.

3. The imaging apparatus according to claim 1, further comprising:
   a setting unit configured to set a photographic sensitivity based on the subject luminance measured by the light metering unit,
   wherein the setting unit is configured to increase an upper-limit value of the photographic sensitivity to be set when determining whether to perform a shooting operation without causing the illumination device to emit light, based on the information acquired by the acquisition unit, if the difference among the plurality of areas in subject distance increases.

4. The imaging apparatus according to claim 1, wherein the light emission control unit is configured to change the threshold value based on a difference between a farthest subject distance and a nearest subject distance among the subject distances of the plurality of areas.

5. The imaging apparatus according to claim 1, wherein the light emission control unit is configured to change the threshold value without referring to a subject distance of a specific area if only the specific area is spaced far from other areas of the plurality of areas by an amount equal to or greater than a predetermined value in subject distance.

6. The imaging apparatus according to claim 1, further comprising:
   a focus detection unit having a plurality of focus detection areas and configured to detect a defocus amount in each of the plurality of focus detection areas,
   wherein the information relating to the subject distances of the plurality of areas acquired by the acquisition unit includes information indicating the defocus amount in each of the plurality of focus detection areas detected by the focus detection unit.

7. The imaging apparatus according to claim 6, wherein the light emission control unit is configured to change the threshold value based on a defocus amount difference between an area where a farthest subject is present and an area where a nearest subject is present among the plurality of focus detection areas.

8. The imaging apparatus according to claim 6, wherein the light emission control unit is configured to change the threshold value based on an averaged defocus amount of the plurality of focus detection areas.

9. The imaging apparatus according to claim 6, wherein the light emission control unit is configured to change the threshold value without using a defocus amount detected from a specific area if only the specific area is spaced far from other areas of the plurality of focus detection areas by an amount equal to or greater than a predetermined value in defocus amount.

10. The imaging apparatus according to claim 1, further comprising:
    a face detection unit configured to detect a face area of a subject based on image data acquired by capturing the subject,
    wherein the information relating to the subject distances of the plurality of areas acquired by the acquisition unit includes size information of a plurality of face areas detected by the face detection unit.

11. The imaging apparatus according to claim 10, wherein the light emission control unit is configured to change the threshold value based on a difference between a maximum value and a minimum value of the size information of the plurality of face areas detected by the face detection unit.

12. The imaging apparatus according to claim 10, further comprising:
    a determination unit configured to determine a main subject based on size information and positional information of the face area detected by the face detection unit,
    wherein the light emission control unit is configured to change the threshold value without referring to a specific face area if the specific face area is positioned on a peripheral side of a face area of the main subject and is smaller than the face area of the main subject in size information by an amount equal to or greater than a predetermined value.

13. The imaging apparatus according to claim 1, wherein the acquisition unit is configured to acquire the information relating to the subject distances of the plurality of areas based on a subject luminance acquired by the light metering unit when the illumination device emits no light and a subject luminance acquired when the illumination device emits light.

14. A method for controlling an imaging apparatus that can perform a shooting operation with an illumination device, comprising:
    measuring a subject luminance;
    acquiring information relating to subject distances of a plurality of areas; and
    causing the illumination device to emit light in a shooting operation if the measured subject luminance is less than a threshold value,
    wherein the threshold value is changed according to a difference among the plurality of areas in subject distance based on the acquired information.

* * * * *